United States Patent

Spencer et al.

[11] Patent Number: 6,047,230
[45] Date of Patent: Apr. 4, 2000

[54] AUTOMATIC BICYCLE TRANSMISSION

[76] Inventors: Marc D. Spencer, 121 Brunswick St., Rochester, N.Y. 14607; Gregory J. Lukins, 123 Wintergreen Way, Rochester, N.Y. 14618-4631; Ezra R. Gold, 180 Elm Ct. #1805, Sunnyvale, Calif. 94086; Frank Duver, 38 Bayview Dr., Apt. D, Northport, N.Y. 11768; Bruce Arden, 101 N. Main St., Apt. 906, Ann Arbor, Mich. 48104

[21] Appl. No.: 08/807,354

[22] Filed: Feb. 27, 1997

[51] Int. Cl.[7] ................................................ F16H 9/00
[52] U.S. Cl. ............................. 701/57; 701/51; 701/59; 474/70; 474/78
[58] Field of Search .............................. 701/51, 55, 56, 701/57, 59; 474/70, 80, 81, 110

[56] References Cited

U.S. PATENT DOCUMENTS

| | | | |
|---|---|---|---|
| 4,490,127 | 12/1984 | Matsumoto et al. | 474/110 |
| 4,693,700 | 9/1987 | Chappell | 474/80 |
| 5,059,158 | 10/1991 | Bellio et al. | 474/70 |
| 5,213,548 | 5/1993 | Collbert et al. | 474/71 |
| 5,254,044 | 10/1993 | Anderson | 474/70 |
| 5,261,858 | 11/1993 | Browning | 474/69 |
| 5,266,065 | 11/1993 | Restelli | 474/78 |
| 5,356,348 | 10/1994 | Bellio et al. | 474/70 |
| 5,357,177 | 10/1994 | Fey et al. | 318/3 |
| 5,551,315 | 9/1996 | Pikoulas | 701/51 |
| 5,599,244 | 2/1997 | Ethington | 474/70 |

*Primary Examiner*—Tan Nguyen
*Attorney, Agent, or Firm*—Banner & Witcoff, Ltd.

[57] ABSTRACT

A gear shifting system for a human-powered chain- or belt-driven vehicle includes a wheel speed sensor, a cadence sensor, a gear changer position sensor, a tension sensor, a clinometer, a controller and a gear changer actuator. The wheel speed sensor senses a speed of a wheel, while the cadence sensor senses a drive rate that a torque drive member drives a torque-transmitting member. The gear changer position sensor senses a position of a gear changer that positions the torque-transmitting member with respect to a plurality of gears. The tension sensor senses a tension of the torque-transmitting member that is transmitting a torque applied to the torque-transmitting drive member to a gear. The clinometer senses an inclination of the vehicle. The controller generates a control signal based on the sensed wheel speed, the sensed torque-member drive rate, the sensed torque-transmitting member tension, the sensed vehicle inclination and the sensed gear changer position. The gear changer actuator is coupled to the gear changer and moves the gear changer in response to the control signal by positioning the torque-transmitting member with respect to the plurality of gears.

27 Claims, 24 Drawing Sheets

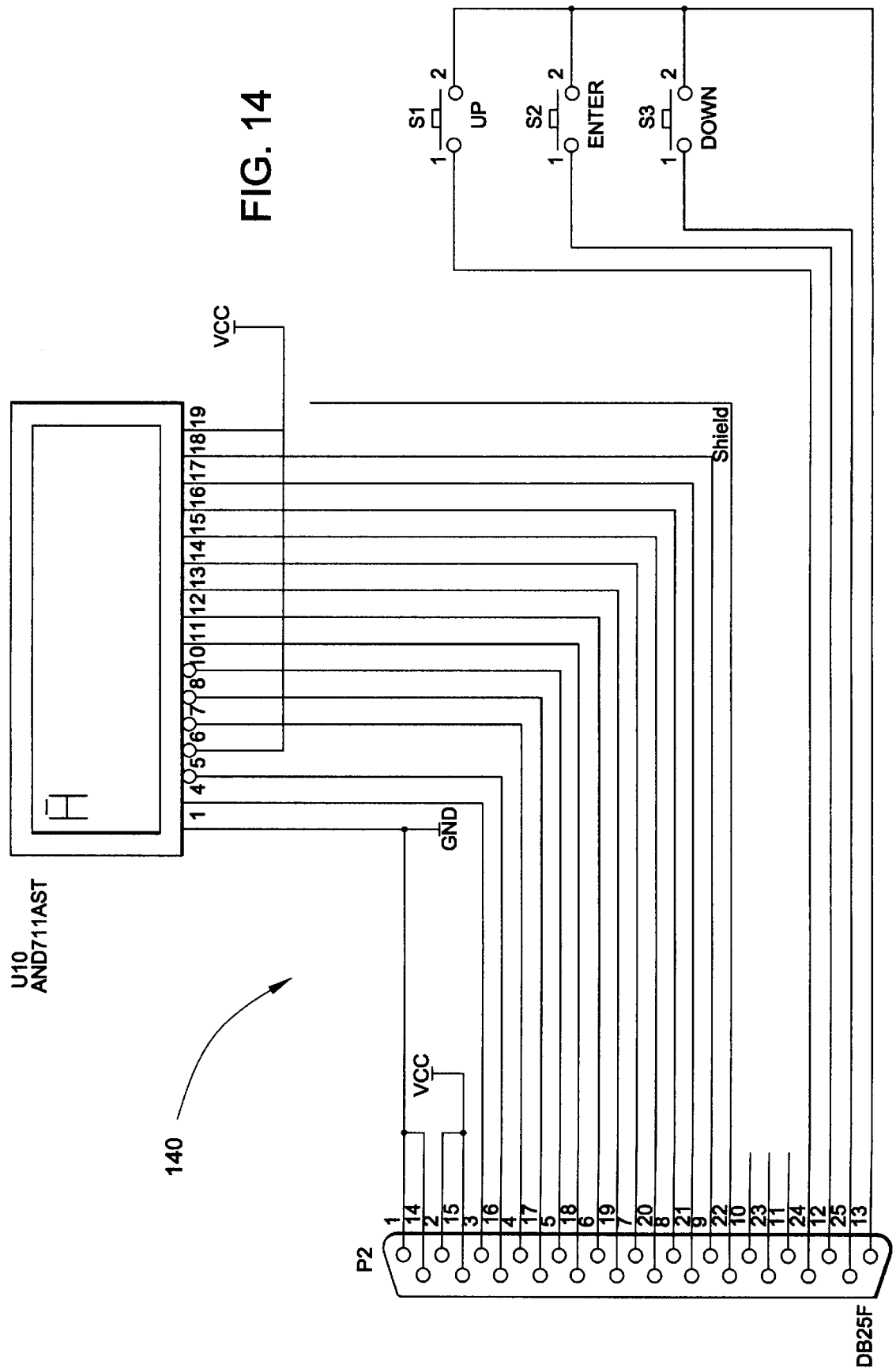

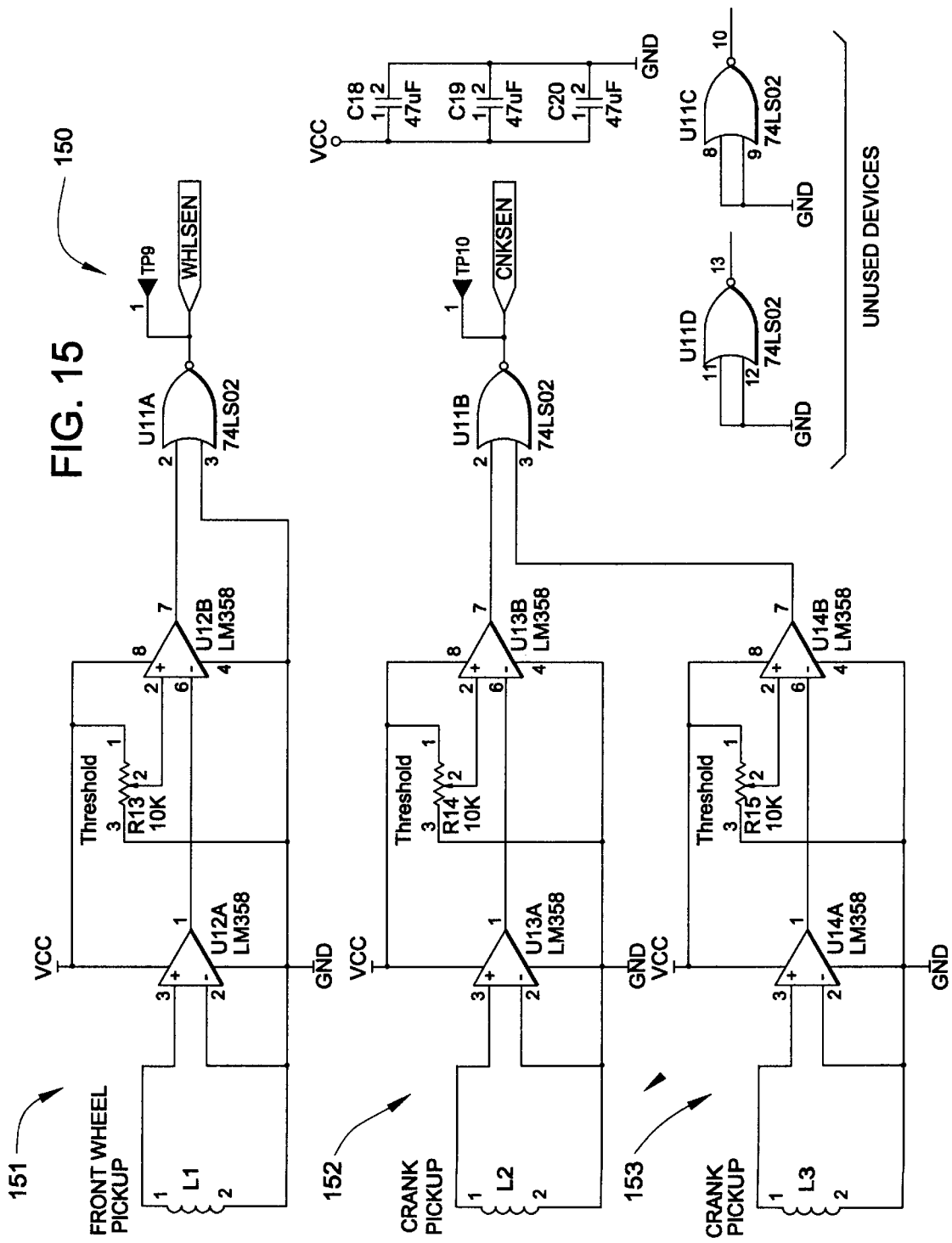

AUTOMATIC BICYCLE TRANSMISSION

CROSS-REFERENCE TO PROVISIONAL APPLICATION

The present application is related to provisional application 60/012,377, entitled "A COMPUTER CONTROLLED AUTOMATIC TRANSMISSION SYSTEM FOR A BICYCLE," filed Feb. 27, 1996, and which is incorporated by reference herein.

BACKGROUND OF THE INVENTION

1. Field of the Invention

The present invention relates to a transmission system for a human-powered vehicle. More particularly, the present invention relates to an automatic transmission system for a human-powered vehicle, such as a bicycle.

2. Description of the Related Art

Human-powered vehicles, such as bicycles, are usually equipped with multi-geared transmission systems that are shifted between incremental gear ratios for making changes in torque applied to the rear wheel, thus providing a vehicle operator with a plurality of possibilities for achieving a desired pedalling cadence and riding speed. The need for multi-geared transmission systems for bicycles and other human-powered vehicles arises from a variety of riding environments combined with different riding styles. For example, a racer tackles hills in a much different way than a rider out for an afternoon tour or a bicycle commuter on the way to work.

While some cyclists prefer manually shifting bicycles transmissions, other cyclists are concerned only with experiencing an enjoyable ride and do not want the burden of gear shifting decisions and manipulations. The latter type of cyclist, and those cyclists who have not learned how to shift properly, may easily cause damage to a bicycle and its transmission. More importantly, the ride experience for these types of cyclist turns out to be rough and uncomfortable.

A variety of shifting systems, some including programmable microprocessors, have been developed for addressing these problems. For example, U.S. Pat. No. 5,261,858 to Browning discloses a shifting system that does not allow shifting when a cyclist is not pedaling. The Browning system has the disadvantage that after a cyclist coasts to a quick stop, the transmission may be left in a high gear ratio. Since the system does not allow shifting when the cyclist is coasting, it is difficult for the cyclist to resume pedaling.

U.S. Pat. No. 5,213,548 to Colbert discloses a shifting device that has a limited number of inputs to the microcontroller of the device. Shifting decisions are made on wheel speed and cadence alone without the benefit of any other relevant information, when in reality, upcoming terrain has a large impact upon a cyclist's shifting decisions.

U.S. Pat. No. 5,356,348 to Bellio discloses a system that provides a constant cadence function, but requires a cyclist to choose from a preset, unchangeable range of cadence values that, once set, are not conveniently changed.

U.S. Pat. No. 5,254,044 to Anderson discloses a system that relies upon a timed actuation of multiple switches for successfully programming the system. A cyclist may become frustrated with the operation of the device and may decide to stop using it altogether.

Although prior systems are reliable and effective in many respects, they offer limited flexibility and provide operating modes having few features. What is needed is a bicycle transmission system that adapts to the style of a cyclist instead of the forcing of the cyclist to adjust to the system; that utilizes information related to the riding environment and the cyclist's conditioning in making shifting decisions; that is easier to use than existing systems; and that is more effective than previous systems for increasing a cyclist's efficiency and safety.

SUMMARY OF THE INVENTION

The present invention provides a bicycle transmission system that adapts to the style of a cyclist instead of using a shifting algorithm that predefines shifting decision points and requires the cyclist to adapt to the shifting decision points. The present invention learns a cyclist's riding style and sets up shifting decision points based on the cyclist's style. By manually shifting the transmission over a typical riding course, the system records operating parameters associated with a set of desired shifting decision points, and then automatically shifts gears when similar situations are again encountered.

The present invention incorporates artificial intelligence for supplementing human intellectual abilities and uses a variety of information regarding the operating environment for automatically shifting a multi-geared variable transmission. Instead of requiring a rider to mentally recognize that the rate the rider is pedalling is too hard or too fast, the present invention recognizes such conditions and makes appropriate gears shifts making cycling more efficient. Thus, a ride becomes more enjoyable and, combined with the ease of use of the present invention, a cyclist is encouraged to ride more often.

A ratcheting front chain ring allows shifting to occur whenever the bicycle is in motion, providing significant improvement over conventional constant cadence systems that require a cyclist to pedal the crank for the system to shift. The present invention allows a cyclist to resume pedaling, even after coasting to a stop, without waiting for the shifting system of the present invention to readjust itself. In this way, the rider is provided with a confident, quick start from a traffic light, stop sign, or after a sudden emergency stop.

Since most ride displeasure for a rider and the most harm to a bicycle transmission is caused when the transmission shifts while the chain is under heavy tension, the present invention prevents such a situation from occurring. The amount of tension on the chain preventing a shift is determined by the cyclist so that the present invention can be customized to the style of the cyclist.

A microcontroller selectively considers information such as information relating to wheel speed, cadence rate, chain tension, cyclist effort and cyclist heart rate when making shifting decisions. In addition to customized automatic modes of operation in which shifting decisions are selectively based on constant cadence, constant (pedalling) force or exponential acceleration, a fully manual mode of operation and a full manual override for each automatic mode can be selected by a cyclist.

The present invention can be easily incorporated into bicycle frames and transmission, or retrofitted into existing frame and transmission designs. The present invention provides an effective technique for improving cycling efficiency, while minimizing additional mechanical components that adversely impact system weight and complexity.

The advantages of the present invention are provided by a gear shifting system for a human-powered chain- or belt-driven vehicle, such as a bicycle. The gear shifting system includes a wheel speed sensor, a cadence sensor, a gear changer position sensor, a tension sensor, a clinometer, a controller and a gear changer actuator. The wheel speed sensor senses a speed of a wheel of a human-powered vehicle, while the cadence sensor senses a drive rate that a torque drive member of the vehicle drives a torque-transmitting member the vehicle, such as a rate of rotation of a crank of a bicycle. The gear changer position sensor senses a position of a gear changer of the vehicle, such as a derailleur or a multi-speed hub gear changer, with the gear changer positioning the torque-transmitting member, such as a chain or a belt, with respect to a plurality of gears of the vehicle. The tension sensor senses a tension of the torque-transmitting member that is transmitting a torque from the torque drive member to a gear of the plurality of gears. The clinometer senses an inclination of the vehicle. The controller generates a control signal based on the sensed wheel speed, the sensed drive rate, the sensed tension of the torque-transmitting member, the sensed vehicle inclination, the sensed gear changer position. The gear changer actuator is coupled to the gear changer and positions the gear changer with respect to the plurality of gears in response to the control signal.

The controller is inhibited from generating the control signal when the speed of the wheel is increasing and the tension of the torque-transmitting member is determined to be greater than a predetermined tension. The gear shifting system further includes a shift-down switch and a shift-up switch. Accordingly, the controller is responsive to actuation of the shift-down switch by generating the shift-down signal, and is responsive to actuation of the shift-up switch by generating the shift-up signal. A display device can be used for displaying at least one of a speed related to the sensed wheel speed, the sensed drive rate, and an indication of the sensed gear changer position with respect to the plurality of gears. The controller can also be configured for generating the control signal based further on an effort of a user of the vehicle, with the effort being proportional to an average sensed tension of the torque-transmitting member during a predetermined period of time, such as one crank revolution.

Preferably, the control signal includes a shift-down signal and a shift-up signal. The gear changer actuator moves the gear changer in response to the shift-down signal for decreasing a gear ratio of the vehicle, and moves the gear changer in response to the shift-up signal for increasing the gear ratio of the vehicle. According to the invention, a Boolean value of chain tension is determined based on a comparison of the sensed wheel speed and the sensed drive rate. Alternatively, the sensed tension of the torque-transmitting member is determined by comparing a product of a current gear ratio and the sensed wheel speed to the sensed drive rate.

A heart rate monitor can be used for sensing a heart rate of a user of the vehicle, in which case the controller generates the control signal further based on the sensed heart rate of the user. When the sensed user heart rate is less than a first predetermined heart rate, the controller generates a shift-up signal, and when the sensed user heart rate is greater than a second predetermined heart rate, the controller generates a shift-down signal. Preferably, the second predetermined heart rate is greater than the first predetermined heart rate. According to the invention, a target heart rate is stored in a memory. The first predetermined heart rate is less than the target heart rate by a predetermined difference and the second predetermined heart rate is greater than the target heart rate by the predetermined difference.

When the sensed drive rate is less than a first predetermined drive rate, the controller is enabled for generating a shift-down signal, and when the sensed drive rate is greater than a second predetermined drive rate, the controller is enabled for generating a shift-up signal. Preferably, the second predetermined drive rate is greater than the first predetermined drive rate.

According to another aspect of the invention, a gear shifting system for a human-powered vehicle, such as a bicycle, includes a tension sensor, a controller, and a gear changer actuator. The tension sensor senses a tension of a torque-transmitting member of the human-powered vehicle. The torque-transmitting member transmits a torque applied to a torque drive member of the vehicle to a gear of a plurality of gears. The controller generates a control signal based on the sensed tension of the torque-transmitting member. The gear changer actuator is coupled to a gear changer of the vehicle and moves the gear changer in response to the shift control signal and repositions the torque-transmitting member with respect to the plurality of gears.

BRIEF DESCRIPTION OF THE DRAWINGS

The present invention is illustrated by way of example and not limitation in the accompanying Figures in which like reference numerals indicate similar elements, and in which:

FIG. 14 shows a schematic block diagram for a display and keyboard circuit according to the present invention;

FIG. 15 shows a schematic diagram for a magnetic pickup signal interface circuit according to the present invention;

DETAILED DESCRIPTION OF THE PREFERRED EMBODIMENTS

Figure 1:
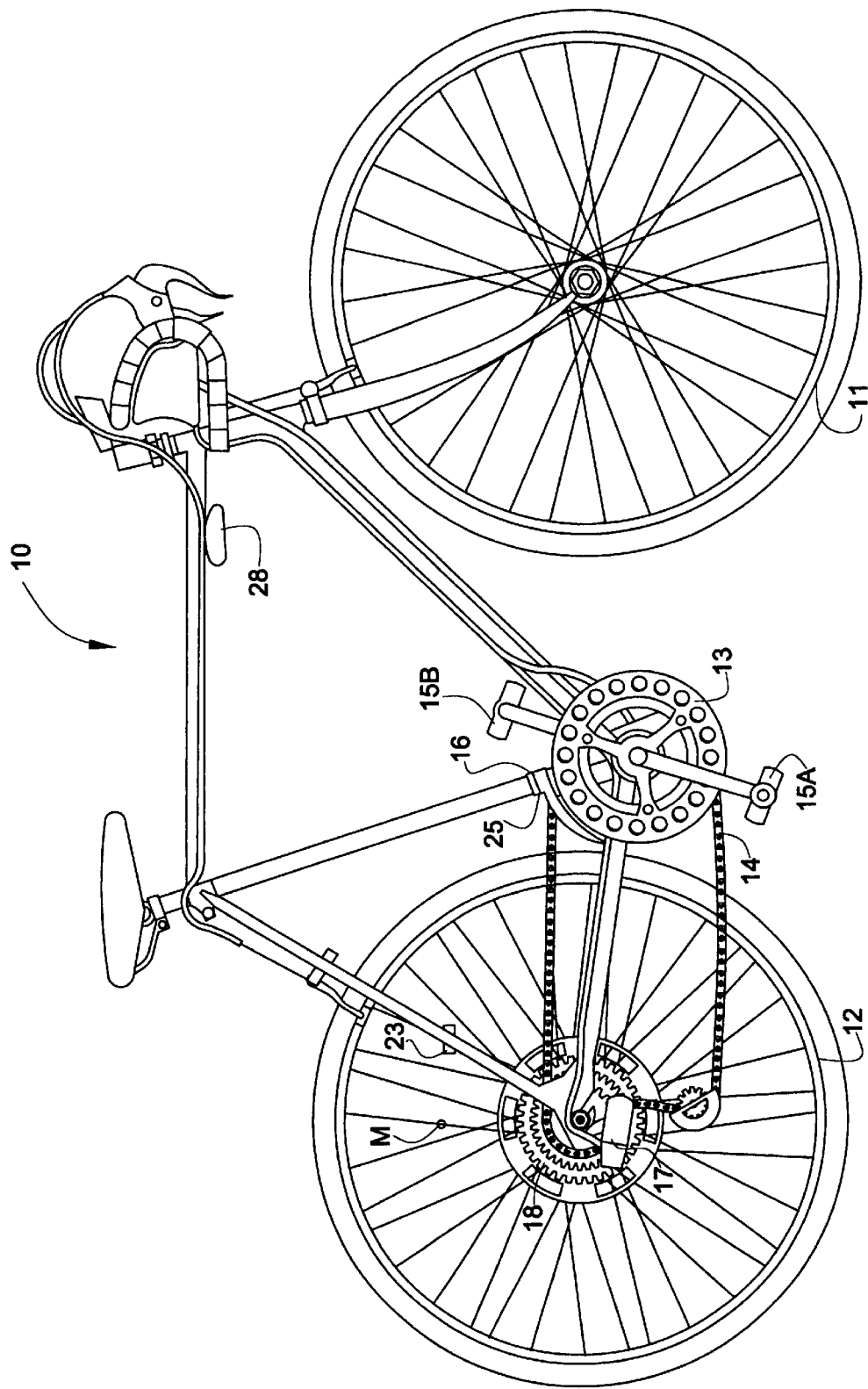
FIG. 1 shows an exemplary bicycle equipped with an automatic transmission system according to the present invention.

FIG. 1 shows an exemplary bicycle 10 equipped with an automatic transmission system according to the present invention. While FIG. 1 shows the present invention adapted for operation with a bicycle, it should be understood that the present invention can also be used with other forms of human-powered chain- or belt-driven vehicles. Bicycle 10 includes a front wheel 11, a rear wheel 12, a crank or chainwheel 13, a chain 14, pedals 15A and 15B, a front derailleur 16, a rear derailleur 17 and a gear set 18.

Bicycle 10 is propelled in a well-known manner by applying a force to the pedals so that chain 14 acts as a torque-transmitting member by transmitting a torque generated at crank 13, which acts as a torque drive member, to rear wheel 12. Crank 13 includes at least one chainring, with each having a different number of teeth. For example, crank 13 has 2 chainrings, with one chainring having 52 teeth and the other chainring having 42 teeth. Gear set 18 includes a plurality of cogs that each have a different number of teeth. For example, gear set 18 has 6 cogs respectively having 13, 15, 17, 19, 21 and 23 teeth. Preferably, gear set 18 is a set of fixed cops, that is, gear set 18 does not freewheel. Chain 14 engages one of the chainrings and one of the cogs of gear set 18 in a well-known closed-loop manner. Derailleurs 16 and 17 are used for positioning chain 14 on a selected chainring and a cog of gear set 18, respectively.

Many cyclists desire to pedal a bicycle at a constant cadence, that is, at a constant rate of rotation of crank 13, or within a narrow range of cadences. Other cyclists may want a different riding parameter to take priority, such as riding at a nearly constant speed, or at a nearly constant heart rate. Selection of an appropriate chainring and a rear cog determines a suitable gear ratio for a particular riding condition and for achieving a desired riding parameter. Gear ratio for purposes of the present disclosure is defined as the number of revolutions of rear wheel 12 for each revolution of crank 13. For example, the plurality of chainrings and rear cogs provides bicycle 10 with gear ratios ranging from 1.83 when chain 14 engages the 42-tooth chainring and the 23-tooth fixed cog, to 4.00 when the 52-tooth chainring and the 13-tooth rear cog are selected.

The present invention automatically selects a gear ratio based on detected riding conditions for achieving any one of a number of desired riding parameters. For example, if constant cadence is the desired riding parameter, the detected riding conditions are evaluated for automatically shifting to a suitable gear ratio for achieving a constant pedalling cadence. If constant torque (as manifested by constant effort) is the desired riding parameter, then bicycle 10 is automatically shifted to a gear ratio for achieving the desired torque. Similarly, if constant heart rate is desired, then the present invention automatically shifts bicycle 10 to an appropriate gear ratio for achieving the desired heart rate.

Figure 2:
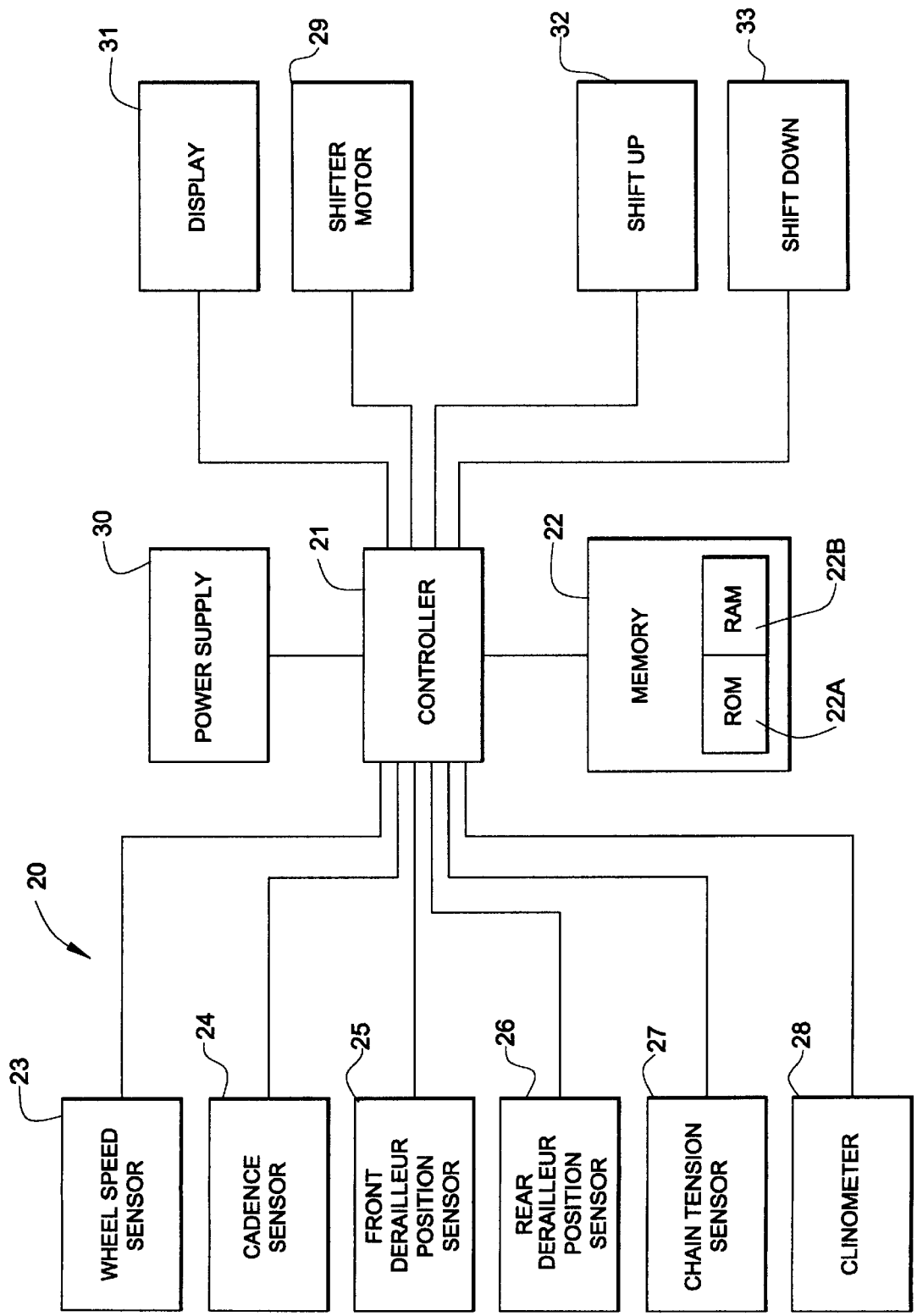
FIG. 2 shows a schematic functional block diagram of an automatic transmission system according to the present invention.

FIG. 2 shows a schematic functional block diagram of an automatic transmission system 20 according to the present invention. System 20 includes a controller 21, a memory 22, a wheel speed sensor 23, a cadence sensor 24, a front derailleur position sensor 25, a rear derailleur position sensor 26, a chain tension sensor 27, a clinometer 28, a shifter motor 29, a power supply 30, a display 31, a shift-up switch 32 and a shift-down switch 33. FIG. 1 shows preferred locations for the components comprising automatic transmission system 20.

Controller 21 preferably is a readily available microcontroller having a suitable operating performance for providing the functions of the present invention. Controller 21 can physically include memory 22 or memory 22 can be physically separate from controller 21, as indicated in FIG. 2. Memory 22 includes a non-volatile memory (ROM) portion 22A, such as a read only memory (ROM) and/or an electronically alterable read only memory (EAROM), and a random access memory (RAM) portion 22B. Non-volatile memory portion 22A stores the program that controller 21 uses for determining whether a gear ratio shift is required. Non-volatile memory portion 23A also stores default operating parameters use for determining gear shift points and for storing bicycle characteristics and user characteristics that are input by a user.

Wheel speed sensor 23 senses the speed of rear wheel 12 by sensing each occurrence of magnet M passing sensor 23. Sensor 23 can also be positioned for sensing the speed of front wheel 11 with magnet M being attached to front wheel 11 accordingly. Cadence sensor 24 senses the drive rate of crank 13, that is, the rate of rotation of crank 13. Front derailleur position sensor 25 senses the position of front derailleur 16. Similarly, rear derailleur position sensor 26 senses the position of rear derailleur 17 with respect to the plurality of gears of gear set 18. Chain tension sensor 27 (FIG. 6) senses the tension of chain 14.

Clinometer 28, such as a plumb bob or capacitive clinometer, senses an inclination or pitch of the bicycle. Plumb bob-type clinometers include a weight on an arm that is connected to a variable resistor. Capacitive-type clinometers having a semiconductive fluid and air bubble positioned between 2 semispheres. The top sphere is etched with four metal triangular sections and the bottom is completely metalized. The capacitance between each of the triangles and the bottom varies as the bubble moves responding to the tilt of the clinometer. The output of clinometer 28 is converted to a usable signal, such as a PWM signal or a linear DC signal.

Controller 21 generates shift control signals that are based on the sensed wheel speed, the sensed crank rotation rate, the sensed chain tension, the sensed bicycle inclination and sensed (front and rear) derailleur positions. A shifter motor 29 is coupled to rear derailleur 17, and is responsive to a shift control signal by moving derailleur 17 for repositioning chain 14 with respect to the plurality of gears of gear set 18. Similarly, a shifter motor is coupled to front derailleur 16 for repositioning chain 14 with respect to the plurality of chainrings of crank 13.

Figure 3:
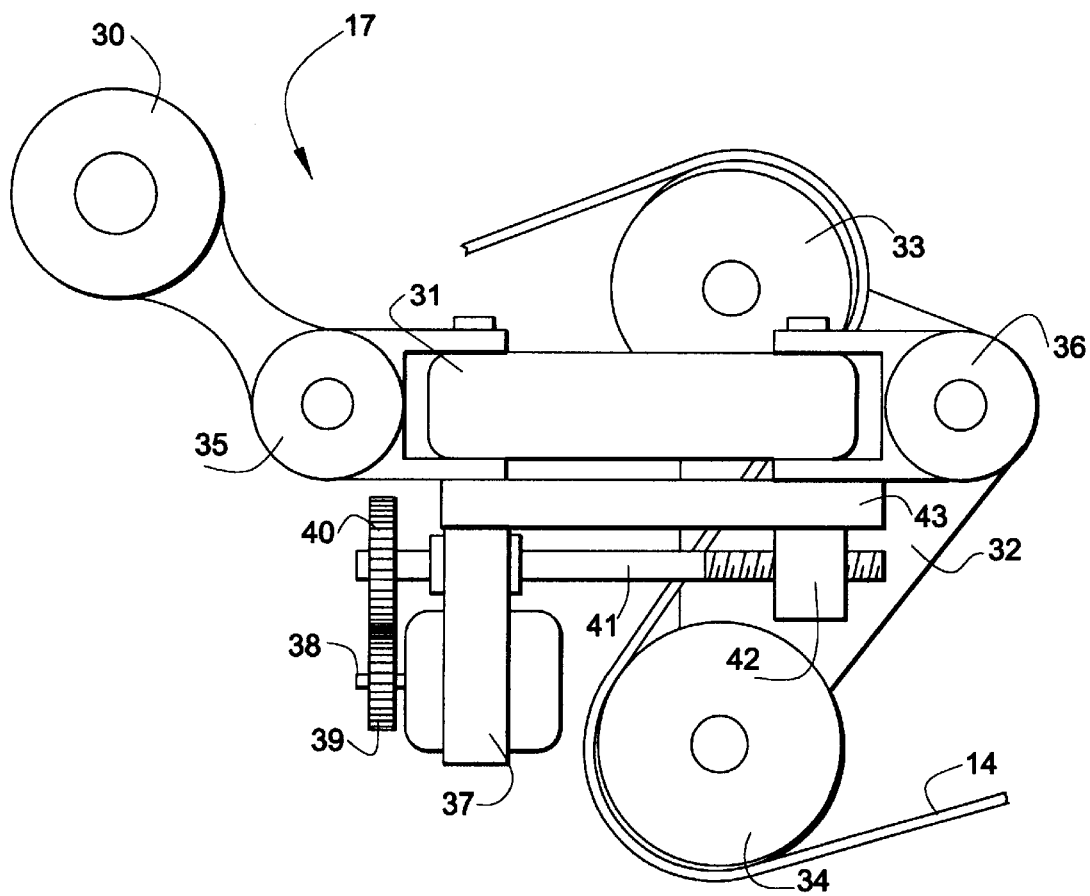
FIG. 3 shows a side conceptual view of a derailleur mechanism according to the present invention.
Figure 4:
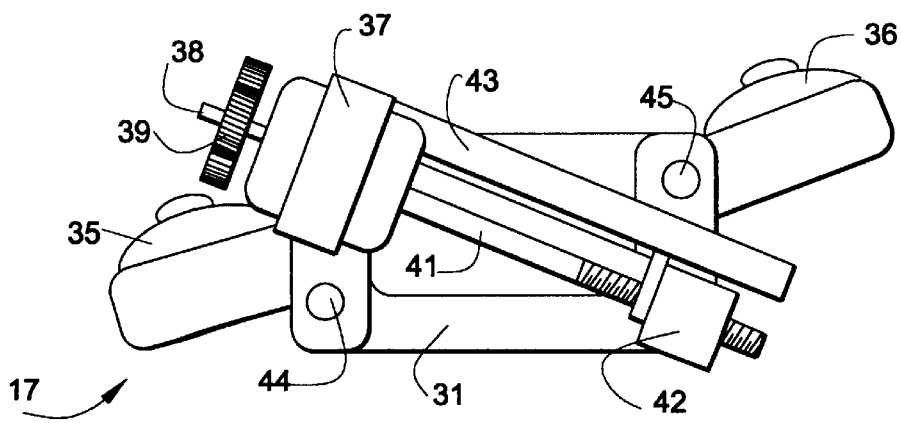
FIG. 4 shows a bottom conceptual view of a derailleur mechanism according to the present invention.
Figure 5A:
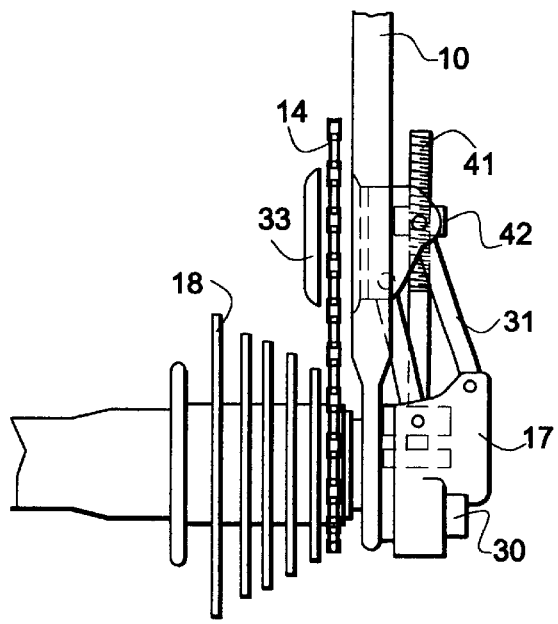
FIG. 5A shows a top view of a derailleur mechanism in relation to a bicycle fixed gear set according to the present invention.
Figure 5B:
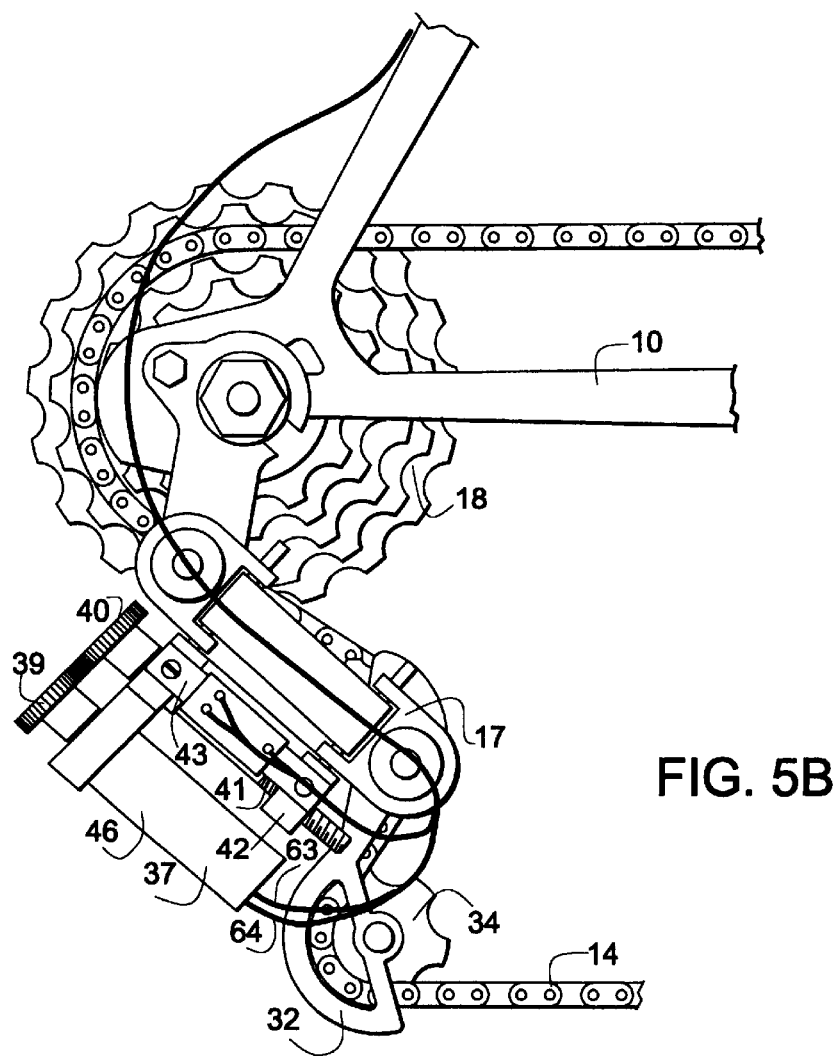
FIG. 5B shows a side view of a derailleur mechanism in relation to a bicycle fixed gear set according to the present invention.

FIGS. 3, 4, 5A and 5B show different views of a rear derailleur mechanism 17 according to the present invention. FIG. 3 shows a side conceptual view and FIG. 4 shows a bottom conceptual view of rear derailleur mechanism 17. FIG. 5A shows a top view and FIG. 5B shows a side view of rear derailleur mechanism 17 in relation to gear set 18.

In FIGS. 3 and 4, rear derailleur mechanism 17 is shown mounted to the bicycle frame at the rear wheel hub 30. Derailleur 17 includes a derailleur parallelogram 31 and an idler gear bracket 32 on which idler gears 33 and 34 are rotatably mounted. Pivot devices 35, 36, 44 and 45 allow derailleur parallelogram 31 and idler gear bracket 32 to operate so that idler gears 33 and 34 take up slack in chain 14 in a well-known manner as derailleur mechanism 17 is shifted through different gear ratios. A motor 37 is attached to derailleur 17 at an outer corner of parallelogram 31. Motor 37 includes a shaft 38 on which a gear 39 is fastened. Gear 39 drives a gear 40 which is attached to one end of a shaft 41. At the end of shaft 41 opposite gear 40, shaft 41 has a threaded portion that is threaded through a threaded member 42. Threaded member 42 is securely fastened to a corner of derailleur parallelogram 31 that is diametrically opposite the corner to which motor 37 is attached. A linear potentiometer 43 is aligned with shaft 41 and is used for sensing the relative position of motor and, hence, the rear cog that chain 14 is engaging.

A standard front derailleur 16 is adapted to work with the present invention by using a motor and a lead screw arrangement that functionally replaces the action of conventional front derailleur cable and which is configured similarly to the motor and lead screw arrangement used for rear derailleur 17. Front derailleur position sensor 25 is a linear potentiometer that is used in a similar manner as linear potentiometer 43.

Figure 6:
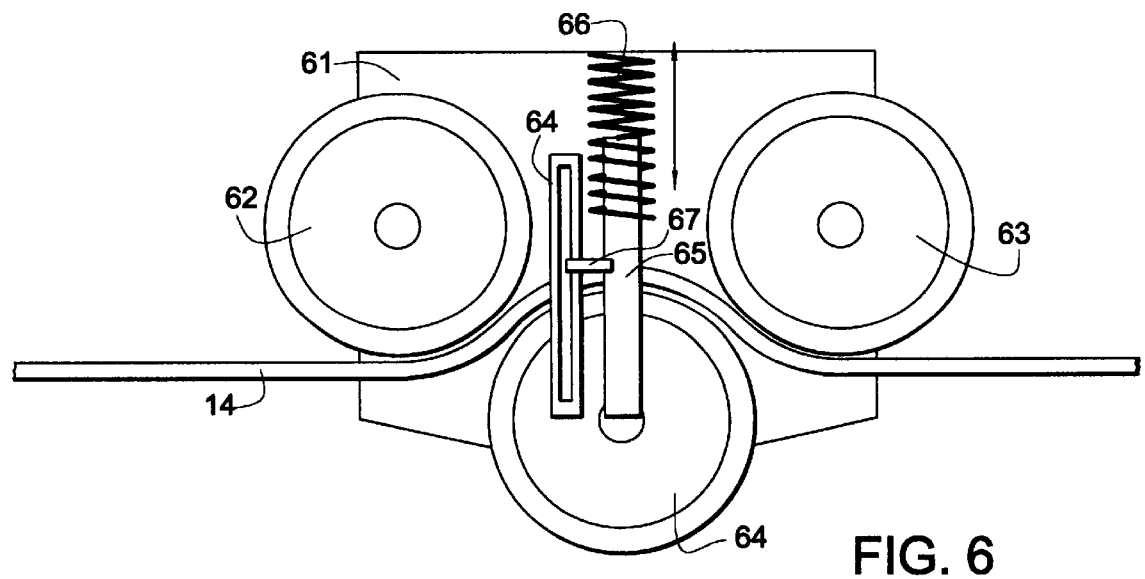
FIG. 6 shows a chain tension sensor according to the present invention.

FIG. 6 shows a chain tension sensor 60 according to the present invention. Chain tension sensor 60 includes a mounting surface 61 on which fixed sprockets 62 and 63 are rotatably mounted. Moving sprocket 64 is attached to mounting surface 61 through member 65 so that sprocket 64 moves parallel to a plane formed by surface 61 against a force provided by spring 66. Member 65 is coupled to a linear potentiometer 64 so that an arm 67 makes an electrical contact with linear potentiometer 64. Chain 14 is threaded between sprockets 62, 63 and 64 so that as the tension of chain 14 varies, sprocket 64 moves against the force of spring 66 and changing the location of where arm 67 makes the electrical contact with potentiometer 64. The relative position of arm 67 as it contacts potentiometer 64 is sensed and is proportional to the tension of chain 14.

Figure 7:
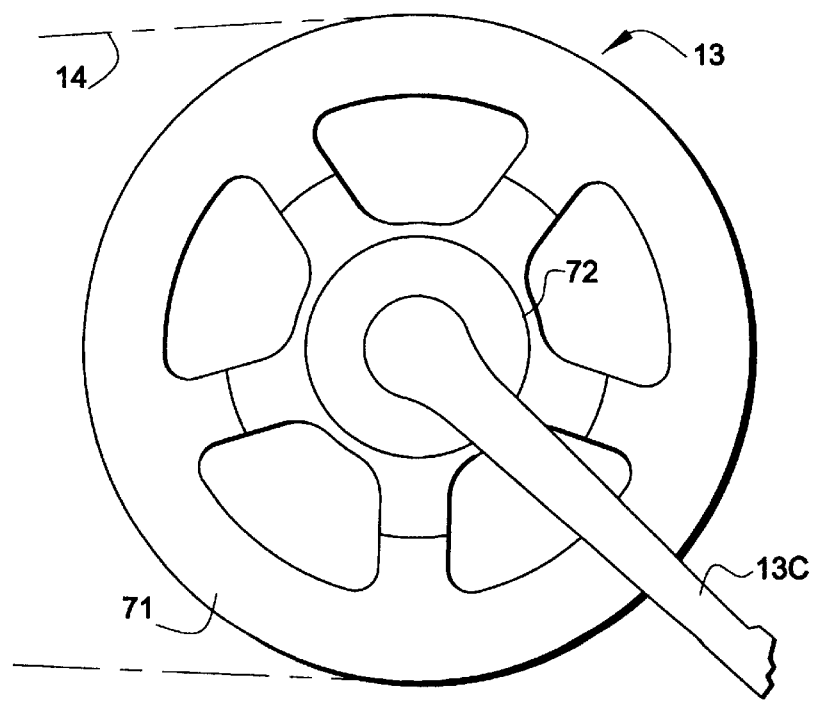
FIG. 7 shows a ratcheting front crank according to the present invention.

FIG. 7 shows a ratcheting front crank 13 according to the present invention. Ratcheting front crank 13 includes at least one chainring 71 having teeth (not shown). Chain 14 engages the teeth in a well-known manner for transferring a torque applied to front crank 13 via arms 13A (FIG. 8) and 13C to rear wheel 12. Front crank 13 also includes a freewheel mechanism 72 so that chainring 71 can continue to rotate when the bicycle is in motion and the rider is not pedalling. This action permits the present invention to shift while the rider is not pedalling because the chain is in motion whenever the bicycle is moving.

Figure 8:
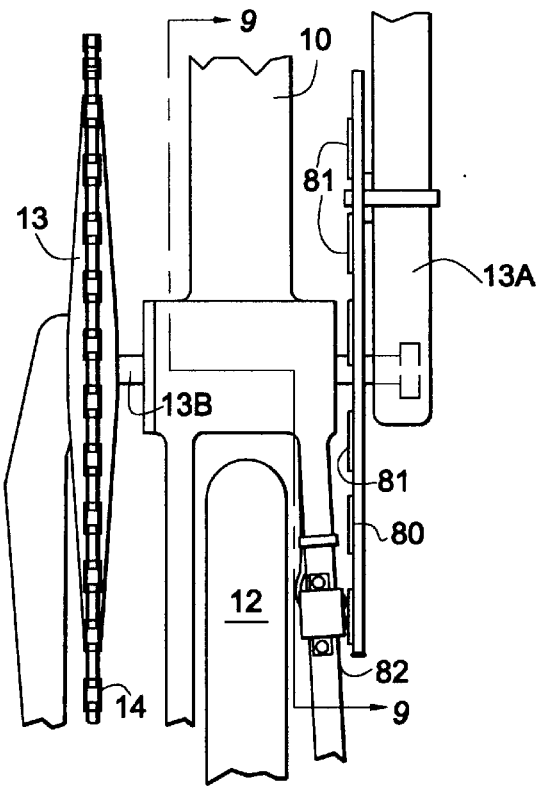
FIG. 8 is a bottom view of a bottom bracket portion of a bicycle showing the physical relationship of the crank sensors according to the present invention.
Figure 9:
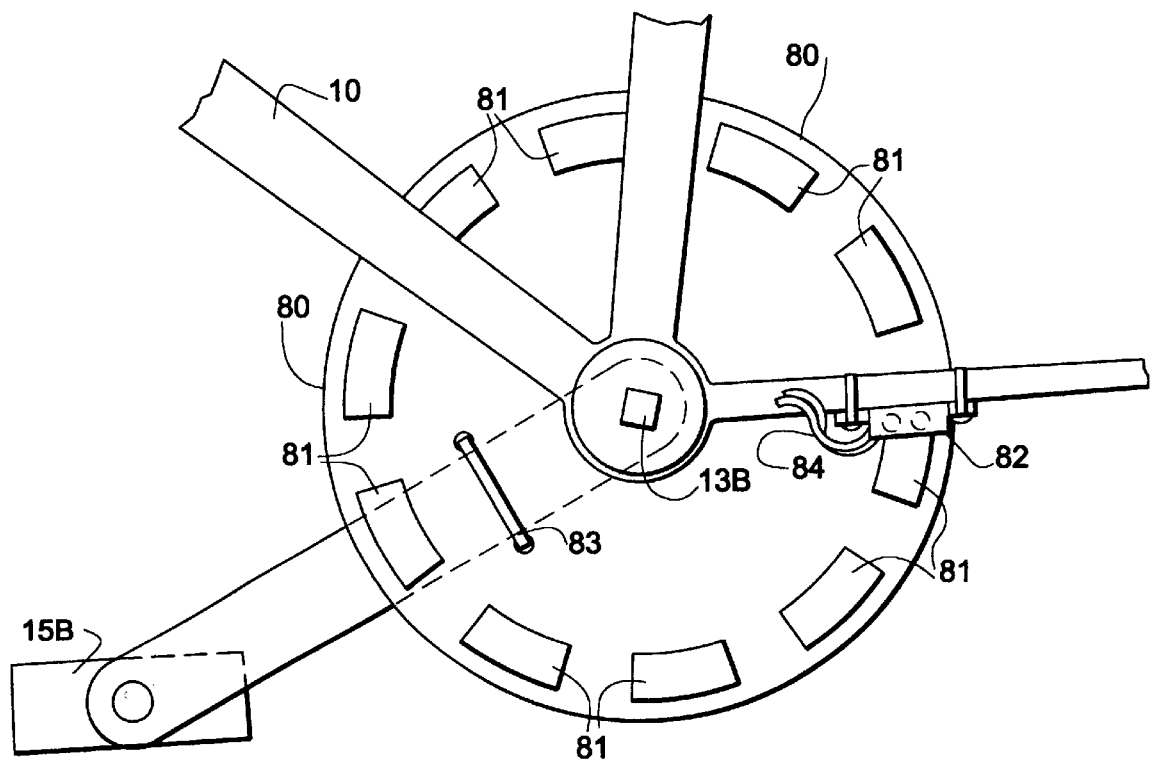
FIG. 9 is a cross-sectional view along line A—A in FIG. 8 showing the physical relationship of the crank sensors according to the present invention.

FIG. 8 is a bottom view of a bottom bracket portion of a bicycle showing the physical relationship of cadence sensor 24 (FIG. 2) to crank 13. FIG. 9 is a cross-sectional view along line A—A in FIG. 8 showing another view of the physical relationship of the crank sensors. FIGS. 8 and 9 show a sensor disk 80 mounted to crank arm 13A using a clip pin 83 so that as bicycle 10 is pedalled, sensor disk 80 rotates uniformly around the rotational axis of crank axle 13B. Sensor disk 80 includes a plurality of magnetic regions 81 that are regularly spaced around the outer edge of disk 80. A sensor 82 is mounted to bicycle 10 so that sensor 82 detects magnetic regions 81 as magnetic regions 81 rotate around the rotational axis of crank axle 13B. Sensor 82 includes two magnetic sensors, such as Hall effect sensors or coils of wire, that are arranged for detecting the rotation of crank 13. Sensor 82 is connected to controller 20 through wires 84, of which only a portion of wires 84 are shown in FIG. 9.

Figure 10:
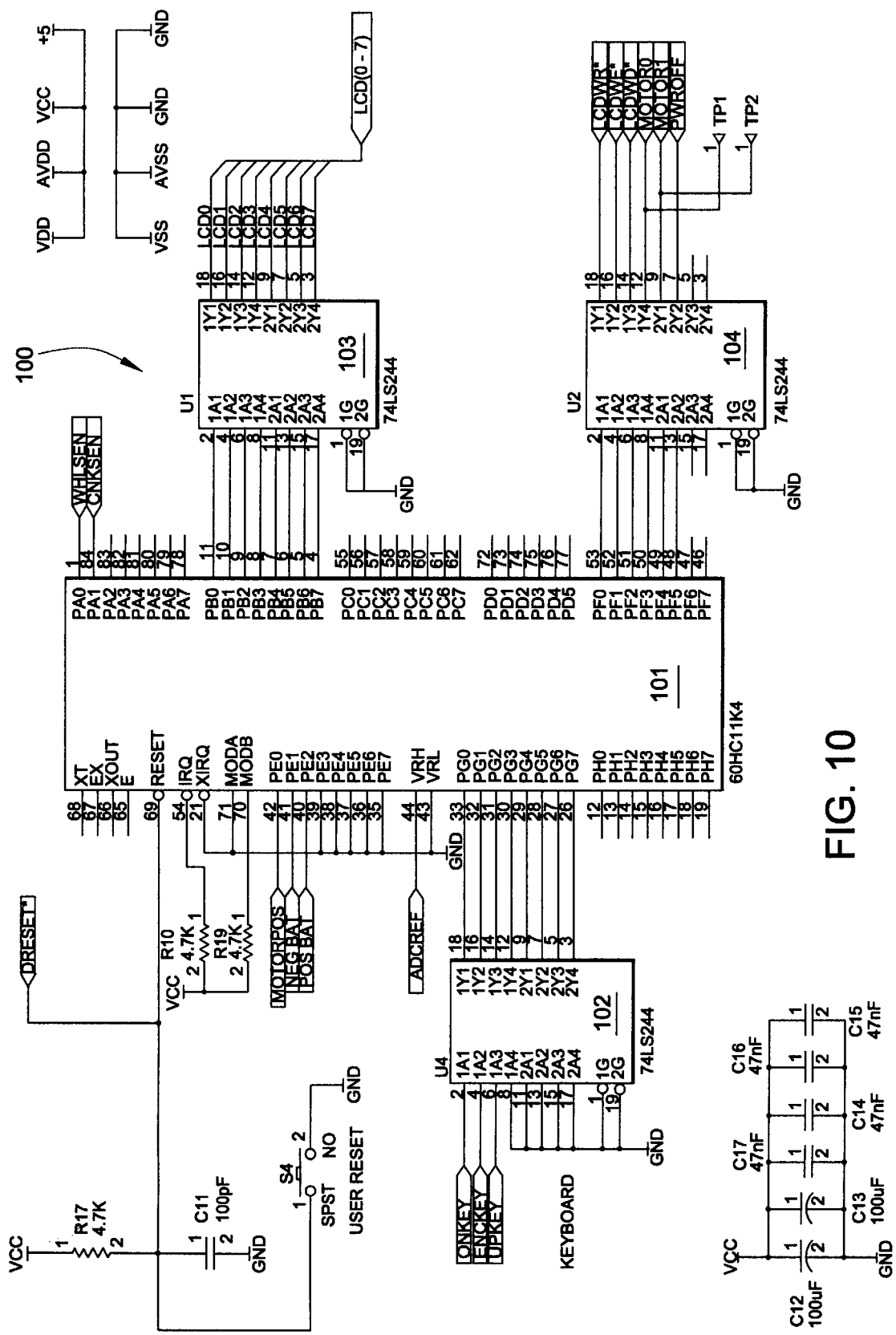
FIG. 10 is a schematic block diagram of the processor circuit of the present invention.
Figure 11:
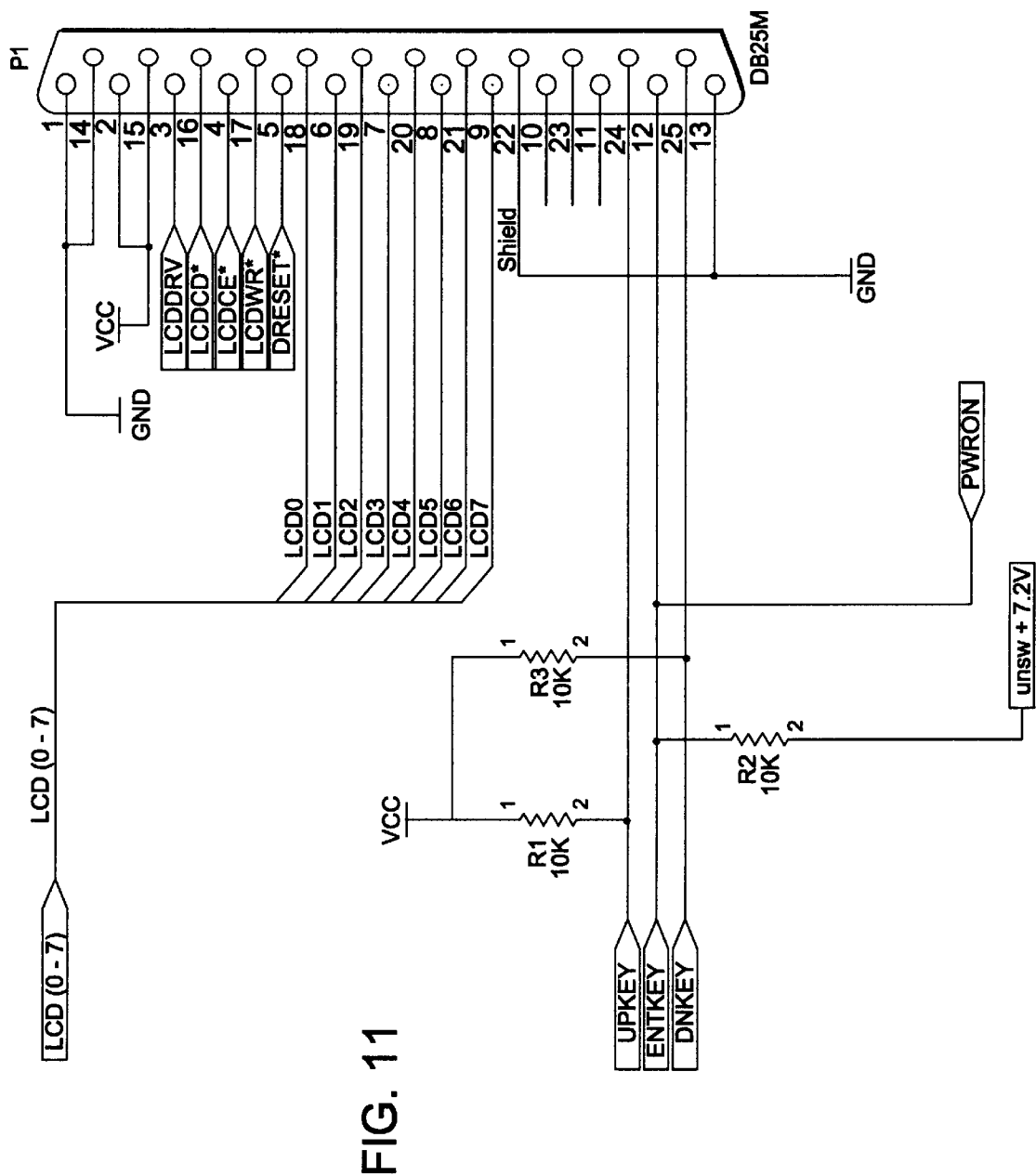
FIG. 11 is a schematic diagram showing connections for a display connector according to the present invention.
Figure 12:
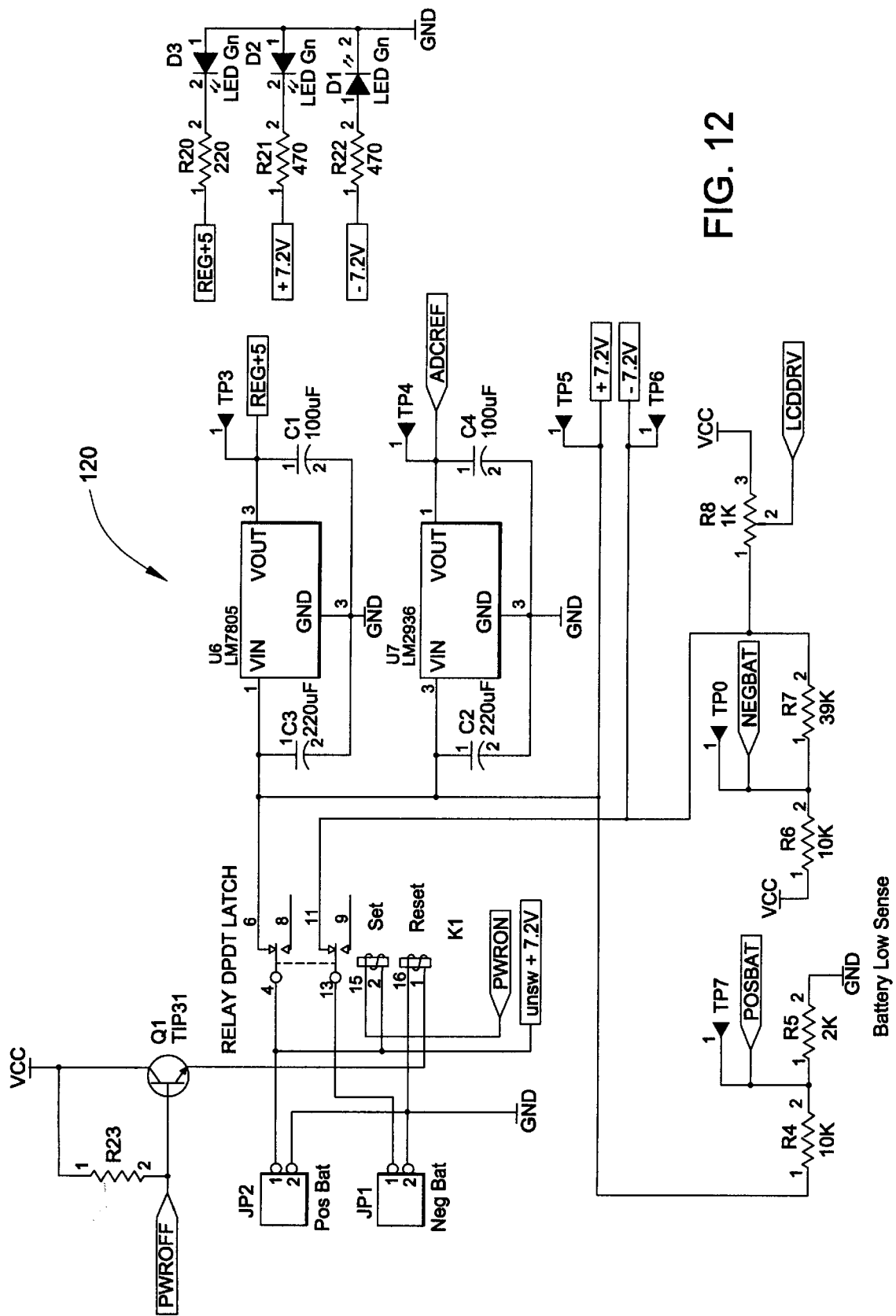
FIG. 12 is a schematic diagram for a power supply circuit according to the present invention.
Figures 13A, 13B:
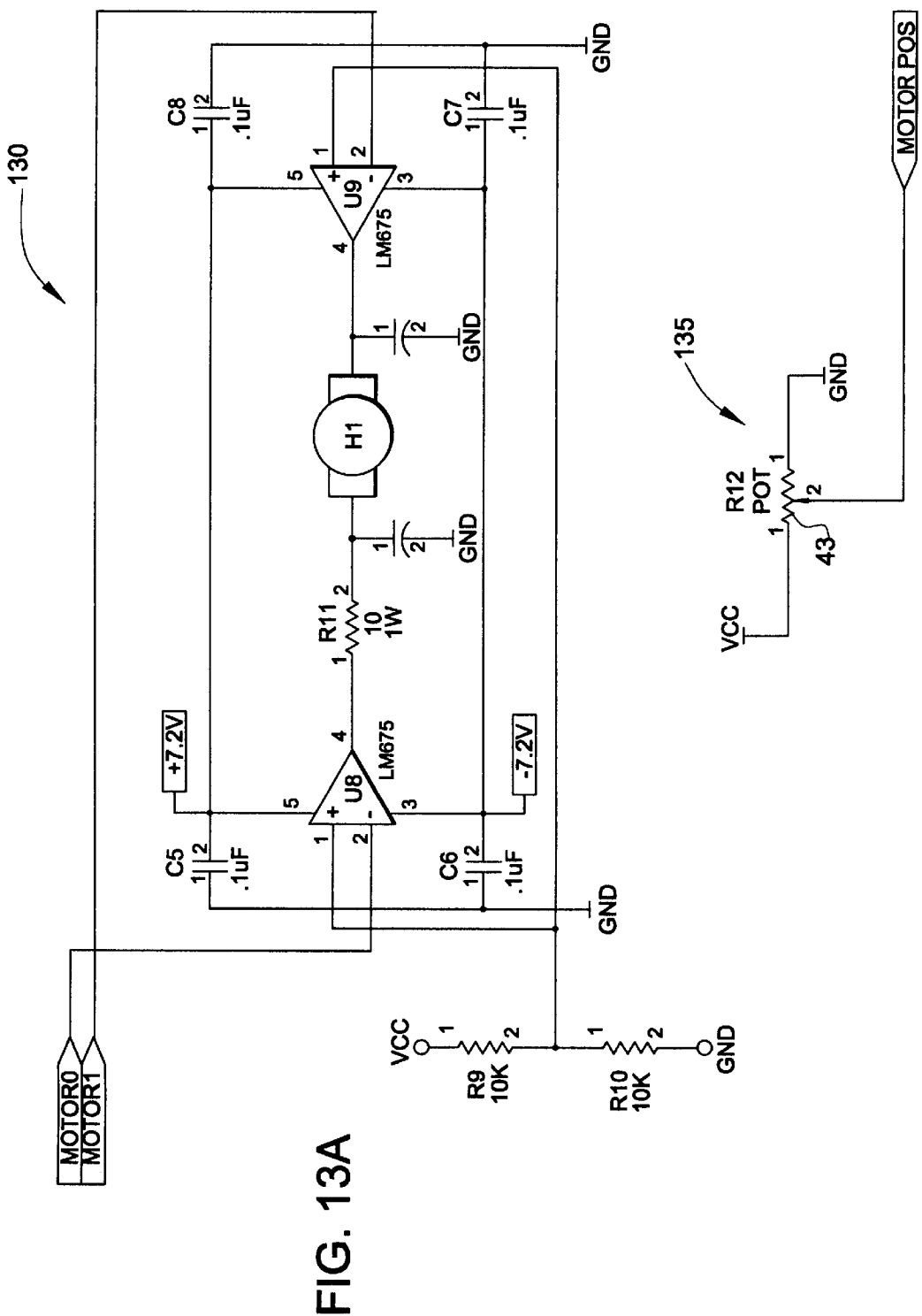
FIG. 13A shows a schematic diagram for a motor drive according to the present invention.
FIG. 13B shows a schematic diagram for a derailleur position switch sensor circuit according to the present invention.

FIGS. 10–15 show schematic block diagrams of controller 20. The circuits shown in FIGS. 10–15 operate in a well-known manner. FIG. 10 is a schematic block diagram of the processor circuit portion 100 of controller 20. Microprocessor 101 corresponds to controller 21 of FIG. 2, and is preferably a suitable single chip micro-controller. Microprocessor 101 is connected to bus drivers 102, 103 and 104. Bus drivers 102, 103 and 104 are each preferably 74LS244 bus drivers. FIG. 11 is a schematic diagram showing connections for a display connector P1. FIG. 12 is a schematic diagram for a power supply circuit portion 120 of controller 20. FIG. 13A shows a schematic diagram for a motor drive circuit portion 130. FIG. 13B shows a schematic diagram for a derailleur position sensor circuit portion 135. Derailleur sensor circuit 135 corresponds to rear derailleur position sensor 26, shown in FIG. 2. FIG. 14 shows a schematic block diagram for a display and keyboard circuit portion 140 of controller 20.

FIG. 15 shows a schematic diagram for a magnetic pickup signal interface circuit portion of controller 20, corresponding to wheel speed sensor 27 shown in FIG. 2. Circuit 151 is a magnetic pickup circuit for sensing speed of a wheel. Sensor L1, such as a Hall effect sensor or a coil of wire, is preferably mounted to bicycle 10 for sensing the speed of rear wheel 12 by sensing a magnet M attached to rear wheel 12. Sensor L1 can also be mounted to bicycle 10 for sensing the speed of front wheel 11. While only one magnet M (FIG. 1) is shown attached to wheel 12, any suitable number of magnets can be attached to wheel 12 and sensed by sensor L1. Amplifier U12A, preferably an LM358, amplifies wheel speed signals picked up by sensor L1. One input of an amplifier U12B, which is also preferably an LM358, is connected to the output of amplifier U12A. The other input to amplifier U12B is connected to a threshold setting potentiometer R13. Amplifier U12B is configured as a comparator so that when the output of amplifier U12A is greater than a threshold level set by potentiometer R13, amplifier U12B outputs a pulse signal that is applied to one input of NOR gate U11A. The other input of NOR gate U11A is connected to ground. NOR gate U11A outputs the wheel sense signal WHLSEN.

Magnetic pickup circuits 152 and 153 (sensor 82 in FIGS. 8 and 9) for sensing rotation of crank 13 are configured the same as magnetic pickup circuit 151, but only a single NOR gate U11B is used for generating the crank sensor signal CNKSEN. Magnetic pickup circuits 152 and 153 correspond to cadence sensor 24.

Figure 16:
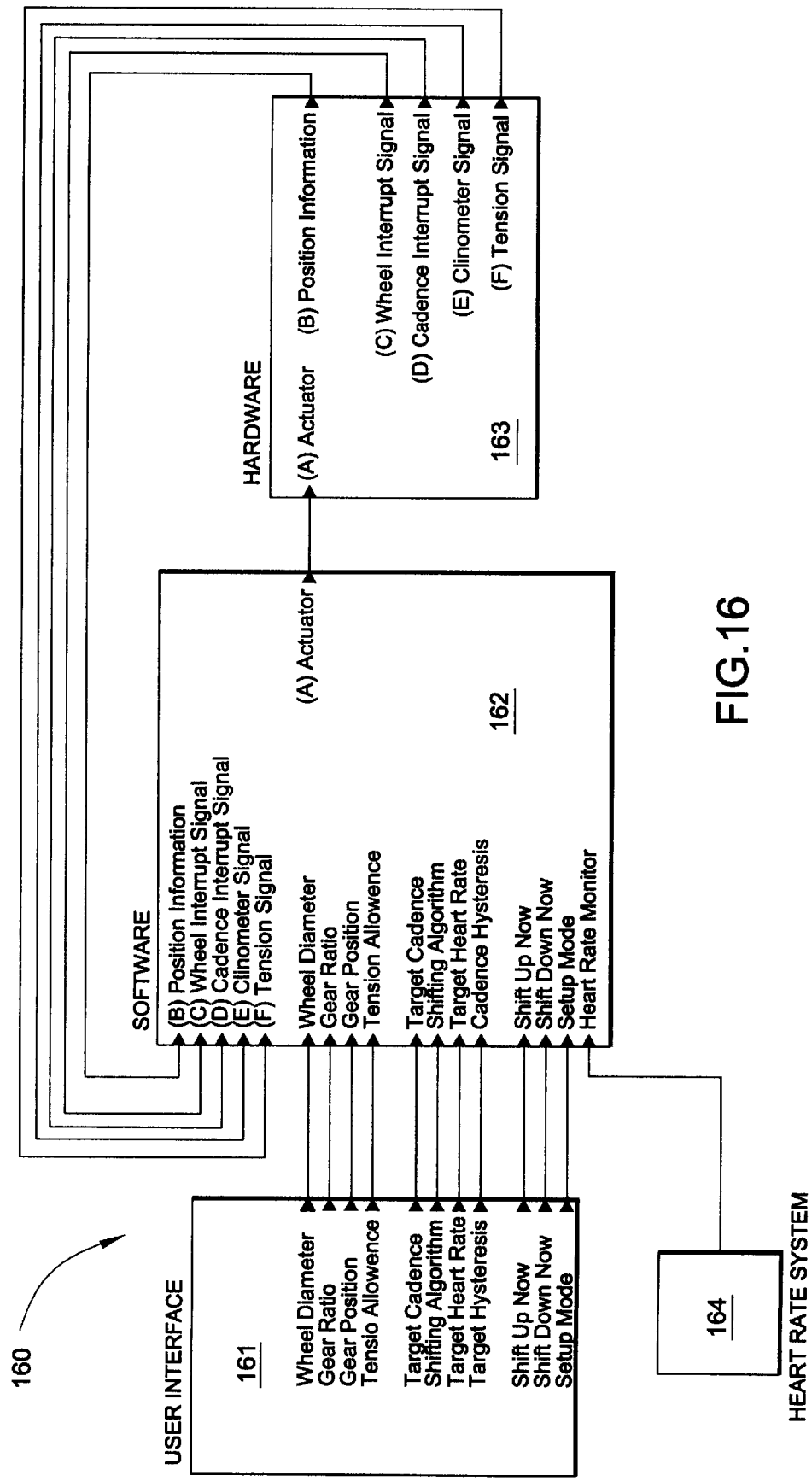
FIG. 16 shows a system functional block diagram according to the present invention.

FIG. 16 shows a system functional block diagram 160 of the present invention. The present invention includes a user interface portion 161, a software portion 162 and a hardware portion 163. When a heart rate monitor is used, the present invention includes a heart rate system 164.

The user interface portion 161 provides an interface for inputting bicycle characteristics, user characteristics and dynamic user inputs. Bicycle characteristics include such characteristics as wheel diameter, gear ratios, gear positions and chain tension allowed. User characteristics include, for example, target cadence, a shifting algorithm selection, target heart rate (when a heart rate monitor is used), and cadence hysteresis. Dynamic user inputs that are provided through the user interface portion 161 are shift-up now, shift-down now and setup mode inputs.

Hardware portion 163 generates mechanical information, such as derailleur position information, wheel interrupt signals, cadence interrupt signals, clinometer signals and chain tension signals for input to the software portion 162. The software portion 162 uses the inputs from the user interface portion 161 and from the hardware portion 163 for generating a derailleur actuator signal. When a heart rate monitor is used, heart rate monitor system 164 generates heart rate monitor signals that are input to the software portion 162.

Heart rate monitor system 164 includes a sensor that is worn by a rider and produces a pulse signal, such as an RF pulse signal, at a frequency that is proportional to the heart rate of the rider. The frequency rate of the pulses are counted by controller 21 in a well-known manner and compared to two set points providing hysteresis around a target heart rate. The present invention adjusts the target heart rate over time to account for warm-up and cool-down intervals.

Figure 17:
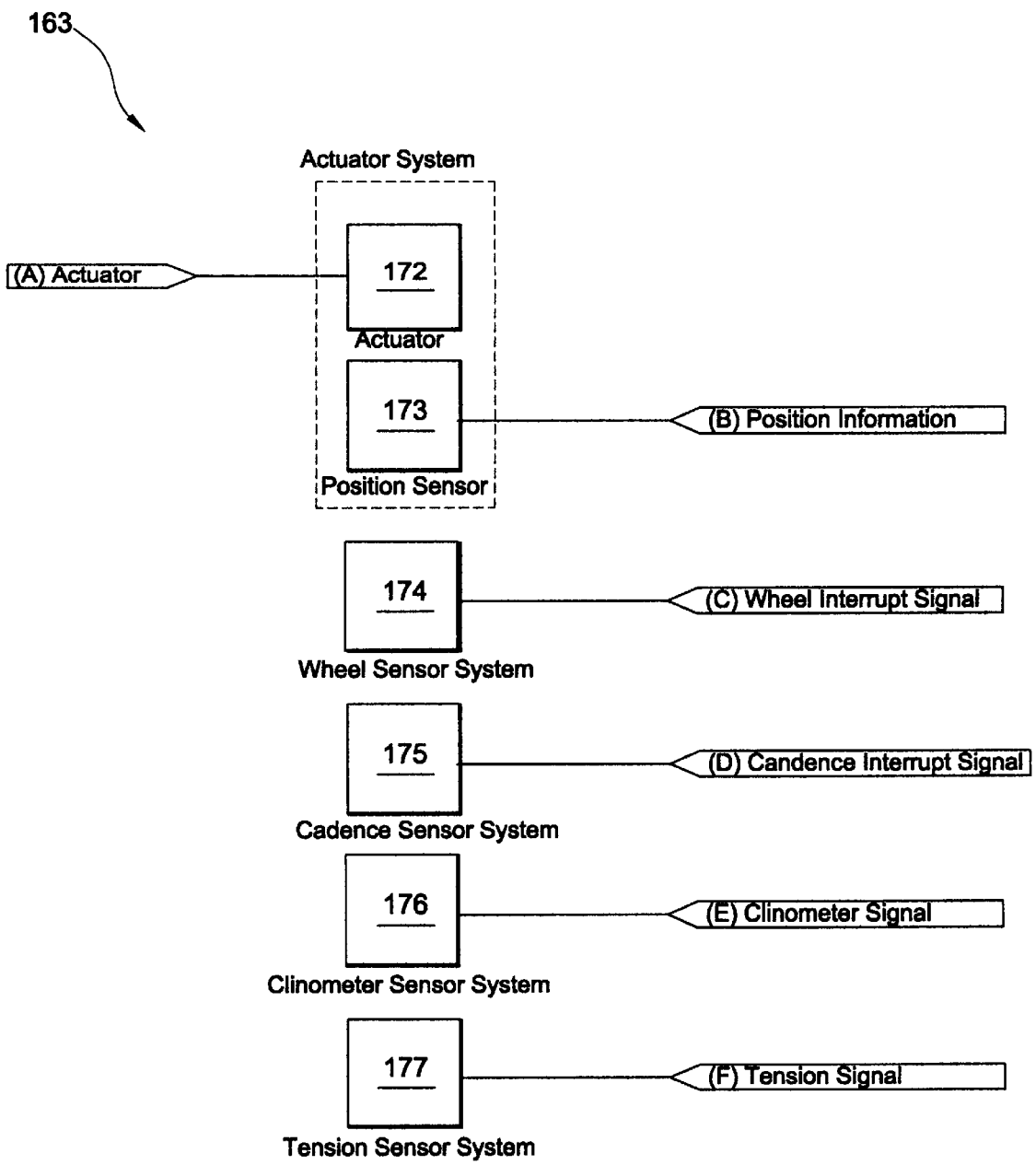
FIG. 17 shows a schematic block diagram for the hardware interface according to the present invention.

FIG. 17 shows a schematic block diagram for the hardware interface 163 according to the present invention. The hardware interface system includes an actuator system 171 having an actuator 172 and a derailleur position sensor 173. Actuator 172 receives the actuator signal generated by software portion 162. Derailleur position sensor 173 generates the derailleur position sensor that is used by software portion 162. Wheel sensor system 174 generates wheel interrupt signal WHLSEN (FIG. 15). Cadence sensor system 175 generates cadence interrupt signal CNKSEN (FIG. 15). Clinometer sensor system 176 generates the clinometer signal and tension sensor system 177 generates the chain tension signal.

Figure 18:
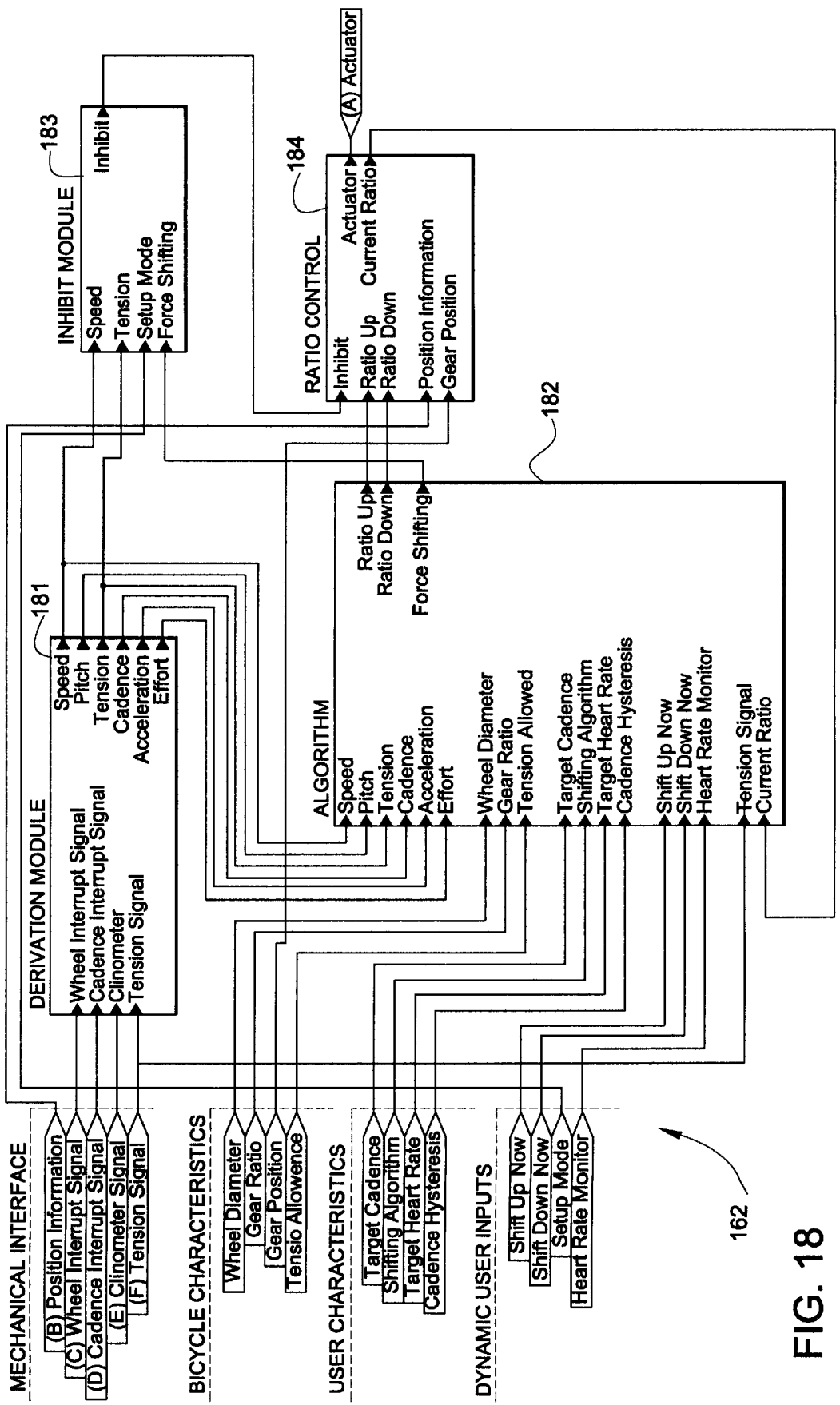
FIG. 18 shows a functional block diagram of the software modules of the present invention.

FIG. 18 shows a functional block diagram of the software modules that form of the software portion 162 of the present invention. A derivation module 181 receives the mechanical information generated by the hardware portion 163 and generates operating variables such as speed, pitch, tension, cadence, acceleration and effort. An algorithm module 182 receives the operating variables generated by derivation module 181, user characteristic inputs and dynamic user characteristic inputs and generates ratio-up, ratio-down and force shifting signals. An inhibit module 183 uses the speed and tension operating variables generated by derivation module 181, the dynamic user input setup mode and the force shifting signal generated by algorithm module 182 for determining whether shifting should be inhibited and generates an inhibit signal accordingly. Lastly, a ratio control module 184 using the inhibit signal generated by inhibit module 183, the ratio-up and ratio-down signals generated by algorithm module 182, the derailleur position information generated by hardware portion 163, and gear position information input as a bicycle characteristic for generating an actuator signal and current ratio signal. The actuator signal is used for actuating a gear shift. The current ratio signal is input to algorithm module 182.

Figure 19:
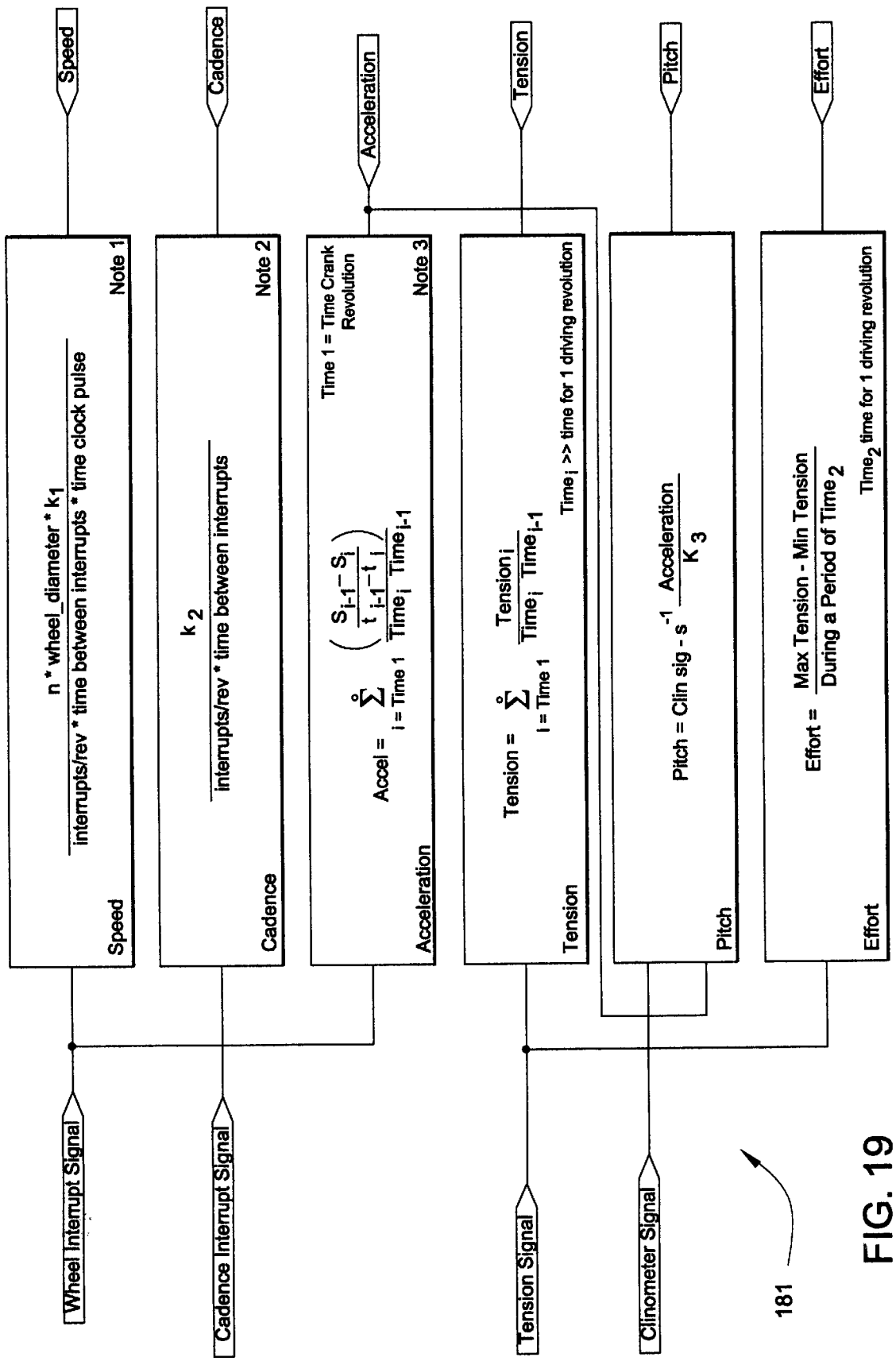
FIG. 19 shows a functional block diagram for the derivation module of the present invention.

FIG. 19 shows a functional block diagram for derivation module 181. Derivation module 181 uses the wheel interrupt signal for generating a speed signal as:

$$Speed = \frac{\pi * (\text{wheel diameter}) * k_1}{(\text{IRQs/rev}) * (\text{time/IRQ}) * (\text{time/clock pulse})} \quad (1)$$

where wheel diameter is the diameter of the wheel, $k_1$ is the number of magnets attached to rear wheel 12 for sensing wheel speed, IRQs/rev is the number of wheel interrupt signals occurring for each wheel revolution, time/IRQ is the amount of time occurring between each wheel interrupt, and time/clock pulse is the amount of time occurring between each clock pulse.

Cadence is generated using the cadence interrupt signal CNKSEN as:

$$Cadence = \frac{k_2}{(\text{interrupts/rev}) * (\text{time/interrupt})} \quad (2)$$

where $k_2$ is the number of magnets used on sensor disk 80 for sensing cadence.

Acceleration is generated based on the wheel interrupt signal as:

$$Acceleration = \sum_{i=Time1}^{0} \frac{\left(\frac{S_{i-1} - S_i}{t_{i-1} - t_i}\right)}{Time_i - Time_{i-1}} \quad (3)$$

where $S_{i-1}$ and $S_i$ are the speed of the bicycle at the previous measurement point and the current measurement point, respectively. The summation of Equation (3) is made over the time interval of the last n wheel rotations. The variable n defines the size of a sliding window that is used for averaging out noise.

Chain tension is generated based on the chain tension signal using:

$$T = \sum_{i=Time1}^{0} \frac{Tension_i}{Time_i - Time_{i-1}} \quad (4)$$

where $Time_1$ is the time for one revolution of crank 13.

Bicycle pitch is determined based on the clinometer signal and the acceleration signal as:

$$Pitch = Clinosig - \sin^{-1}(K_3 \cdot Acceleration) \quad (5)$$

where, Clinosig is the clinometer signal, and $K_3$ is an empirically determined compensation factor included for reflecting the mass (or fluid) inertia of the clinometer.

Effort is generated based on the chain tension signal as:

$$Effort = (Tension_{max} - Tension_{min})|_{Time_1} \quad (6)$$

where, $Tension_{max}$ is the maximum chain tension and $Tension_{min}$ is the minimum chain tension measured during time period $Time_1$ for one revolution of crank 13.

Figure 20:
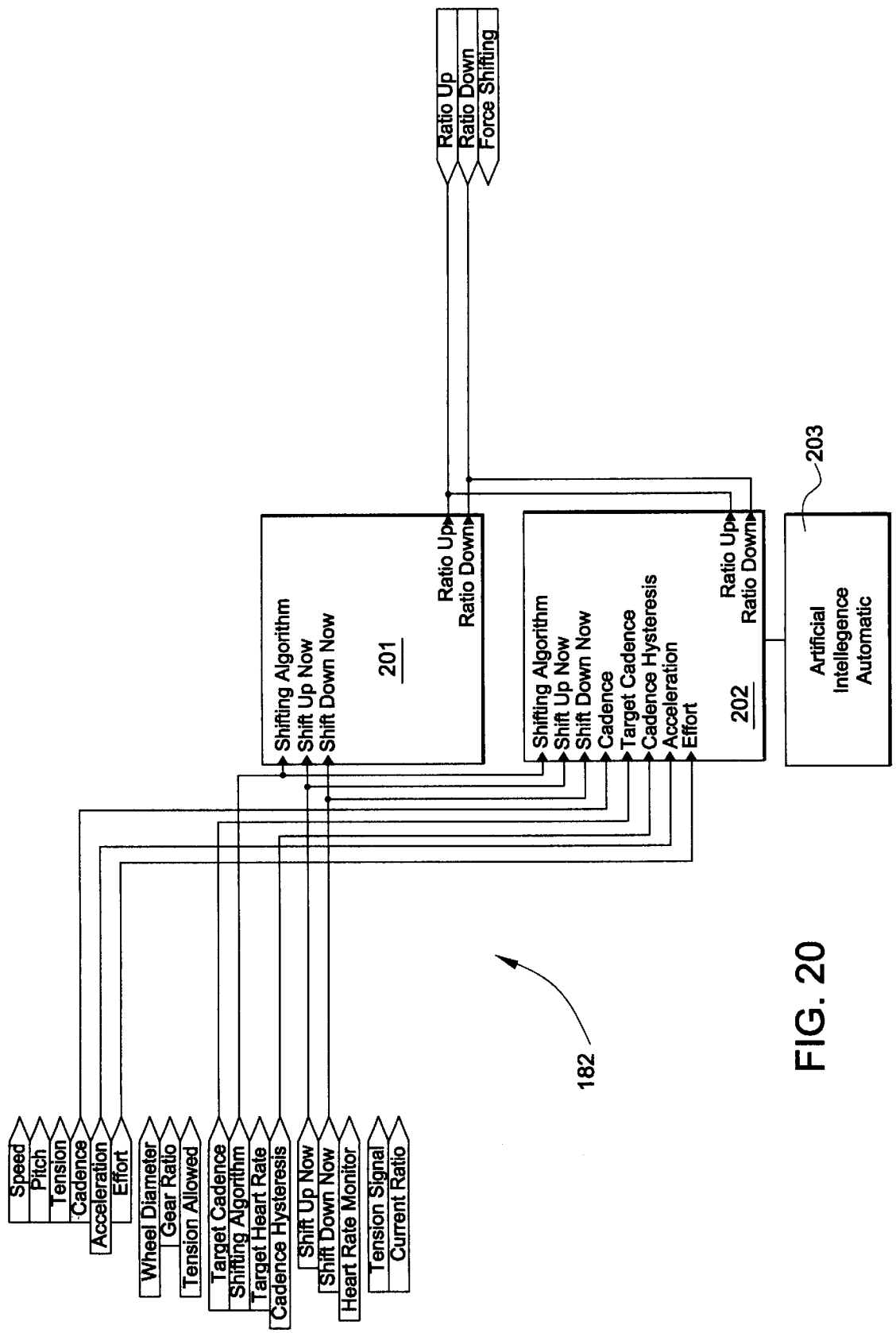
FIG. 20 shows a functional block diagram for the algorithm module of the present invention.

FIG. 20 shows a functional block diagram for algorithm module 182. Algorithm module 182 includes a manual shift module portion 201, a constant cadence module portion 202 and an automatic module portion 203 providing artificial intelligence.

Figure 21:
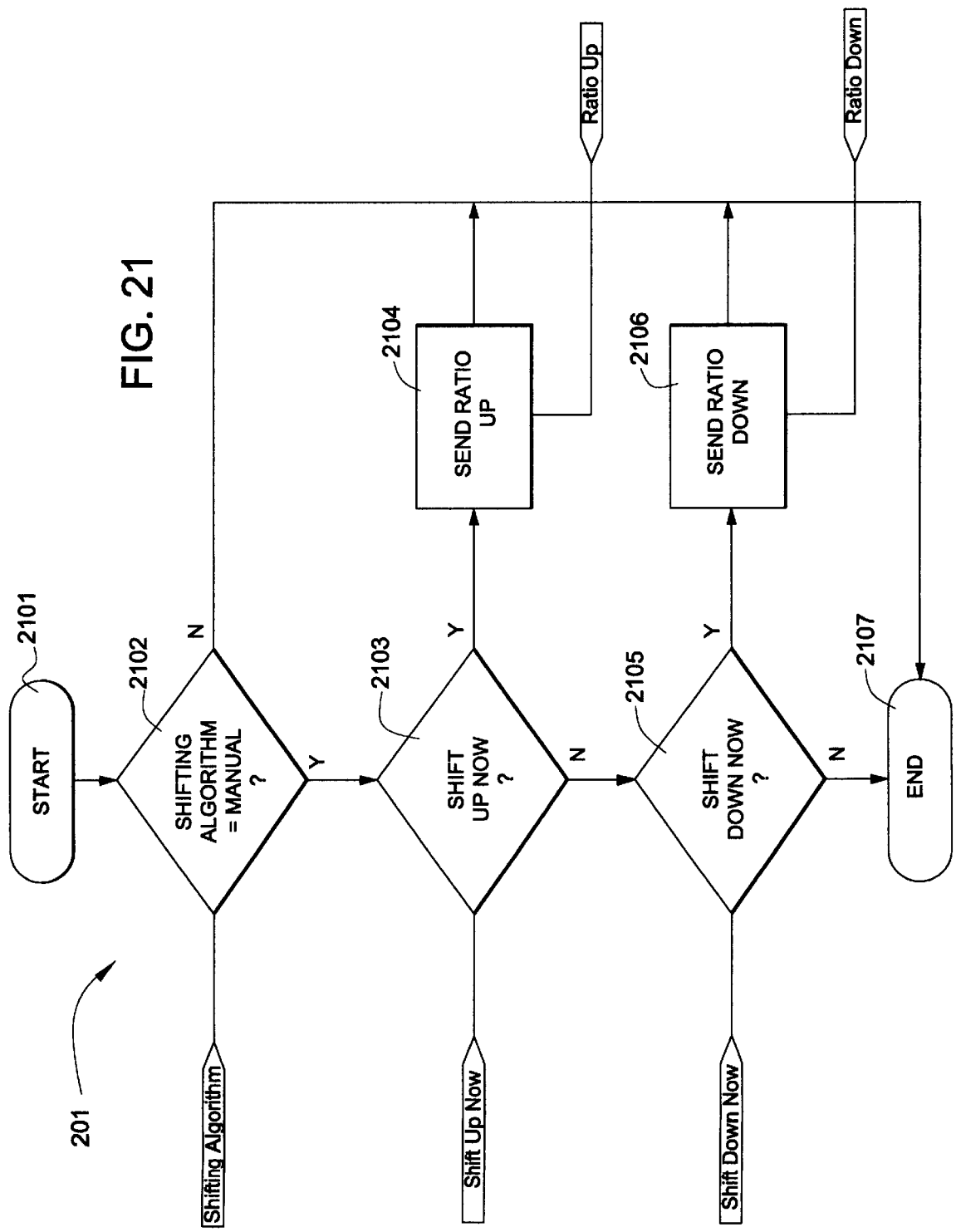
FIG. 21 shows a flow diagram for the manual shift module of the algorithm module of the present invention.

FIG. 21 shows a flow diagram for the manual shift module portion 201. Module 201 is entered at 2101. At 2102, it is determined whether the shifting algorithm for a manual shift mode of operation has been selected by the user based on the shifting algorithm input. If not, the module is exited at 2107. If so, flow continues to 2103 where it is determined whether a shift-up now input has occurred. If so, at 2104 a ratio-up signal is sent to ratio control module 184, and module 201 is exited at 2107. If not, flow continues to 2105, where it is determined whether the user has entered a shift-down now command. If so, at 2106 a ratio-down signal is sent to ratio control module 184, and module 201 is exited at 2107. If not, module 201 is exited at 2107

Figure 22:
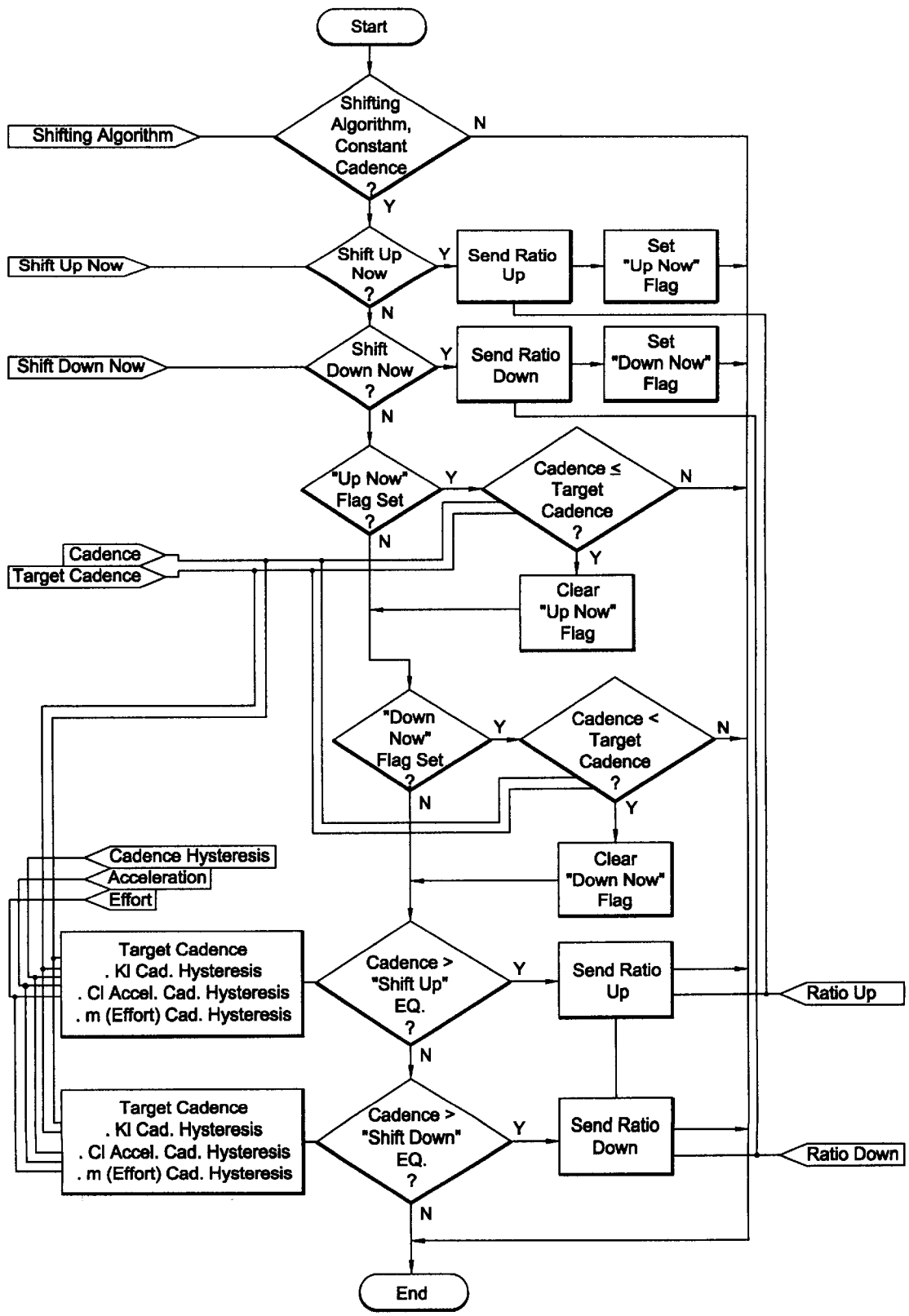
FIG. 22 shows a flow diagram for the constant cadence module of the algorithm module according to the present invention.

FIG. 22 shows a flow diagram for constant cadence module portion 202. Module 202 are entered at 2201. At 2202, it is determined whether the shifting algorithm for a constant cadence mode of operation has been selected by a user based on the shifting algorithm input. If not, module 202 is exited at 2221.

If the constant cadence shifting algorithm has been selected, flow continues to 2203 where it is determined whether the user has entered a manual shift-up now command. If a manual shift-up now command has been entered, flow continues to 2204 where a ratio-up output signal is generated and sent to ratio control module 184. Flow continues to 2205 where an "up now" flag is set. Module 202 is then exited at 2221.

If no manual shift-up now command has been entered, it is determined at 2206 whether a manual shift-down now command has been entered. If so, flow continues to 2207 where a ratio-down output signal is generated and sent to ratio control module 184. Flow continues to 2208 where a "down now" flag is set. Module 202 is then exited at 2221.

If no manual shift-down now command has been entered, flow continues to 2209 where it is determined whether an "up now" flag is set. If the "up now" flag is set, flow continues to 2210 where it is determined whether the cadence equals the target cadence. If not, the module is exited at 2221. If so, flow continues to 2211, where the "up now" flag is cleared. Flow continues to 2212.

If the "up now" flag is not set at 2208, flow continues to 2212, where it is determined whether the "down now" flag is set. If the "down now" flag is set, flow continues to 2213 where it is determined whether the cadence equals the target cadence. If the cadence does not equal the target cadence, module 202 is exited at 2221. If yes, flow continues to 2214, where the "down now" flag is cleared. Flow continues to 2216.

At 2216, it is determined whether the cadence is greater than a target cadence based on inputs from 2215. At 2215, the target cadence used at 2216 is determined based on the target cadence input by the user, a cadence hysteresis, acceleration and effort values. If the cadence is greater than the target cadence, a ratio-up signal is sent to ratio control module 184 at 2216, and module 202 is exited at 2221. If not, flow continues to 2217, where it is determined whether cadence is greater than the target cadence based on inputs from 2218. At 2218, the target cadence is determined based on the target cadence input by the user, the cadence hysteresis, acceleration and effort values. If so, a ratio-down signal is sent to ratio control module 184 at 2230, and module 202 is exited at 2221.

Automatic module portion 203 allows controller 21 to supplement human intellectual abilities. That is, instead of requiring a rider to mentally recognize that the rider is pedaling too hard or too fast, for example, automatic module portion 203 recognizes these kinds of conditions and makes appropriate decisions. Inputs that are relatively more important are recognized in a continually changing situation, and shifting decisions are made accordingly. The artificial intelligence feature of the present invention includes two aspects: parameters that are periodically stored in non-volatile memory, and decision making capability based on a plurality of conflicting inputs.

The artificial intelligence of the present invention uses a fuzzy rule-based system and can include neural networks to form an adaptive expert system. Preferably, the fuzzy rule-based system translates human experience directly into a programmable format instead of a computationally slow, statistical model. For example, instead of shifting when a rider's cadence exceeds 73.84 rpm exactly, controller 21 issues a shift decision when the rider is pedalling "too fast". Consider the problem of deciding how to increase a gear ratio after a rider crests the top of a hill. According to the invention, the appropriate decision making rule is formulated as: IF the cyclist's effort is decreasing rapidly AND the inclination angle is decreasing, THEN shift up a gear. "Rapidly decreasing effort" and "decreasing inclination angle" are fuzzy sets. The extent that each set is fulfilled is evaluated based on the effort and clinometer measurements. If the rider's efforts and vehicle inclination angle fall strongly within the "rapidly decreasing effort" and the "decreasing inclination angle", respectively, then a shifting decision is performed.

Figure 23:
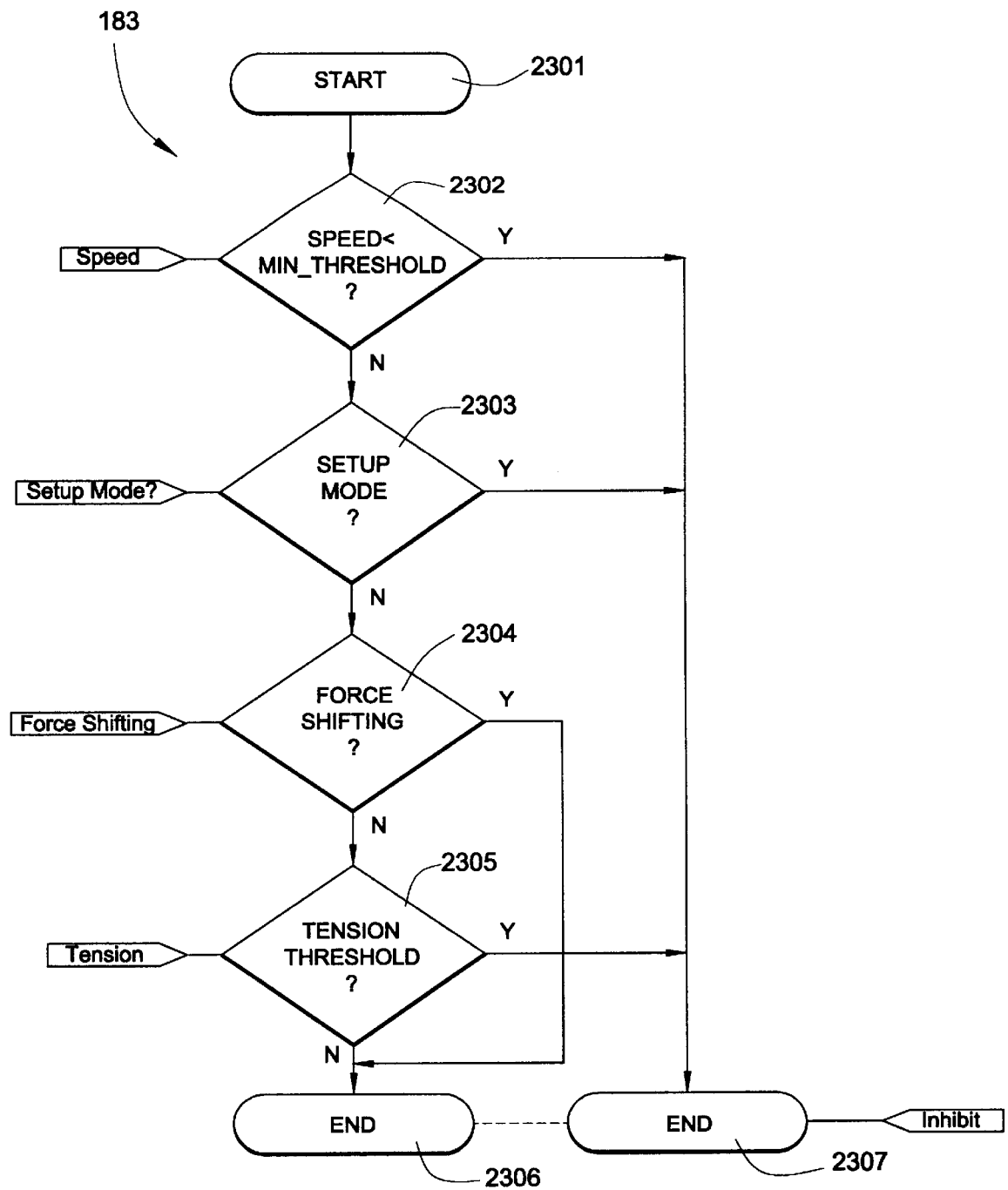
FIG. 23 shows a flow diagram for the inhibit module of the present invention.

FIG. 23 shows a flow diagram for inhibit module 183. The module is entered at 2301 and at 2302 it is determined whether the speed is less than a minimum threshold value. If so, module 183 is exited at 2307 with an inhibit signal being sent to ratio control module 184. If the speed is not less than a minimum threshold, flow continues to 2303 where it is determined whether the setup mode is active. If so, module 183 is exited at 2307 with an inhibit signal being sent to ratio control module 184. If not, flow continues to 2304 where it is determined whether shifting should be forced. If so, the module is exited at 2306 without an inhibit signal being generated. If not, flow continues to 2305 where it is determined whether the chain tension is greater than a preset tension threshold. If so, module 183 is exited at 2307 with an inhibit signal being generated. If not, module 183 is exited at 2306 without an inhibit signal being generated.

Figure 24:
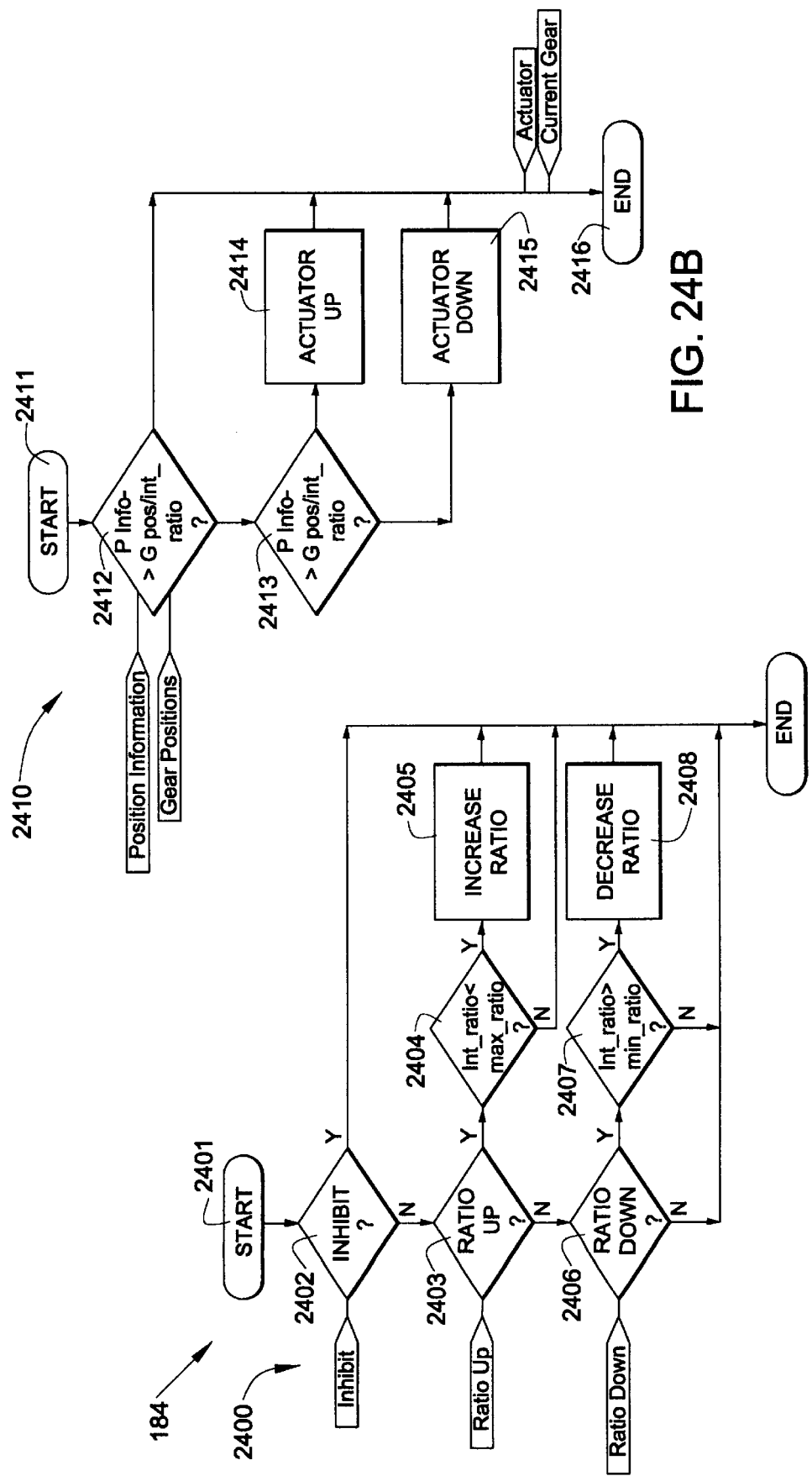
FIG. 24A shows a flow diagram for the logic module of the ratio control module of the present invention.
FIG. 24B shows a flow diagram for the actuate module of the ratio control module of the present invention.

FIG. 24A shows a flow diagram for a logic module 2400 of ratio control module 184. Logic module 2400 is entered at 2401 and at 2402 it is determined whether an inhibit signal has been sent to ratio control module 184. If so, ratio control module 184 is exited at 2409. If not, flow continues to 2403 where it is determined whether a ratio-up signal has been sent. If a ratio-up signal has been sent, flow continues to 2404 where it is determined whether the internally calculated ratio is less that the maximum ratio. Is it is, then flow continues to 2405 where the ratio is increased. If not, module 2400 is exited at 2409.

If a ratio-up signal has not been sent, flow continues to 2406 where it is determined whether a ratio-down signal has been sent. If no ratio-down signal has been sent, module 2400 is exited at 2409. If a ratio-down signal has been sent, flow continues to 2407 where it is determined whether the internally calculated ratio is greater than the minimum ratio. If it is, then flow continues to 2408 where the ratio is decreased. If not, module 2400 is exited at 2409.

FIG. 24B shows a flow diagram for the actuate module 2410 of ratio control module 184. Actuate module 2400 corresponds to the function of the increase ratio functional block 2405 and the decrease ratio functional block 2408 of ratio control logic module 184. Actuate module 2410 is entered at 2411. At 2412, it is determined whether the current derailleur position information is equal to the internally calculated gear position. If it is, actuate module 2410 is exited at 2416. If not, flow continues to 2413 where it is determined whether the derailleur position information is less than the internally calculated gear position. Is it is, flow continues to 2414 where an actuate up signal is generated and the current gear value as a result of the actuate-up signal is calculated before module 2410 is exited at 2416. If the derailleur position information is not less than the internally calculated gear position, the flow continues to 2415 where an actuate-down signal is generated and the current gear value as a result of the actuate-down signal is calculated before module 2410 is exited at 2416.

Figure 25:
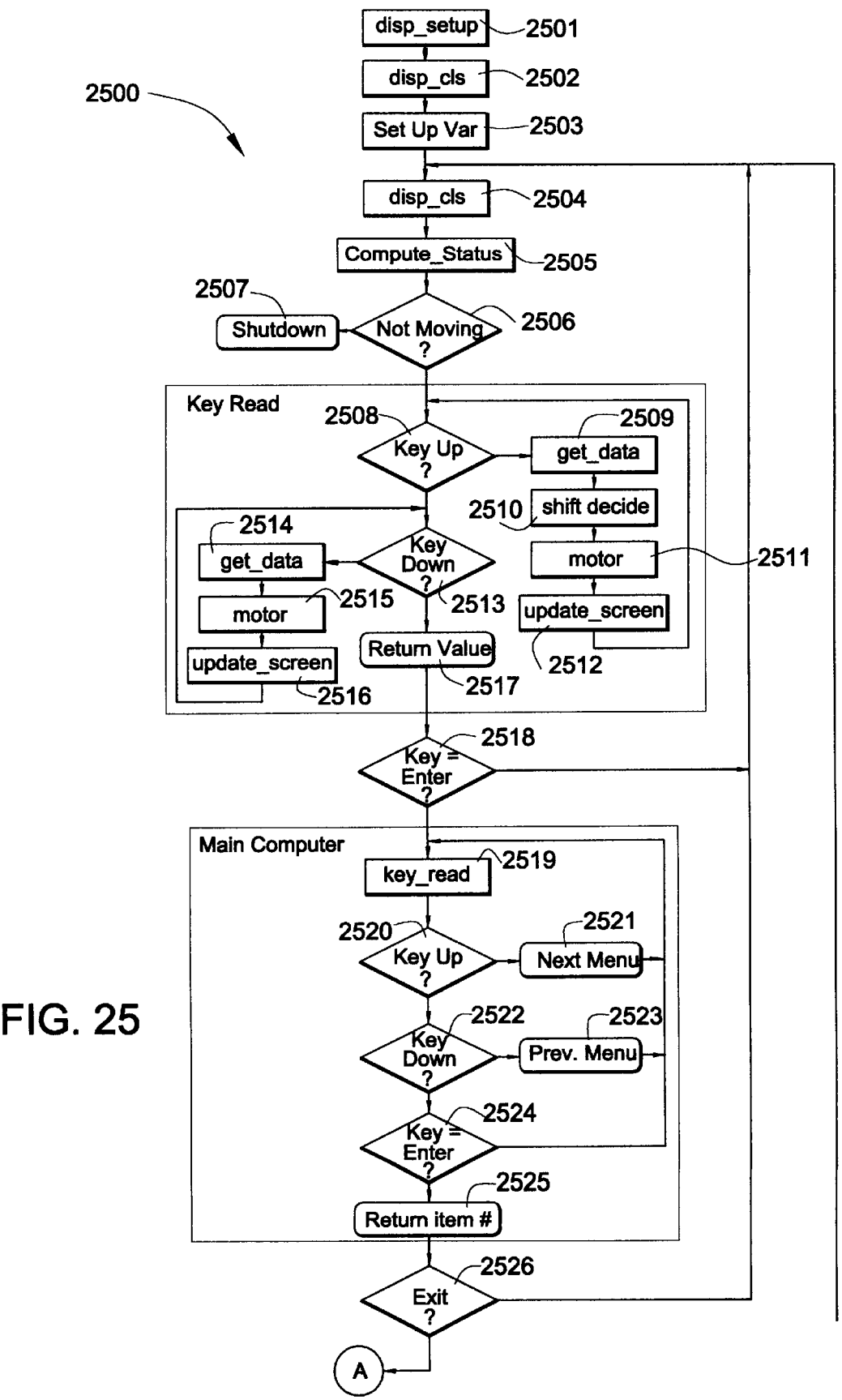
FIGS. 25, 26 and 27 show an exemplary flow diagram for the main user interface service loop according to the present invention.
Figure 26:
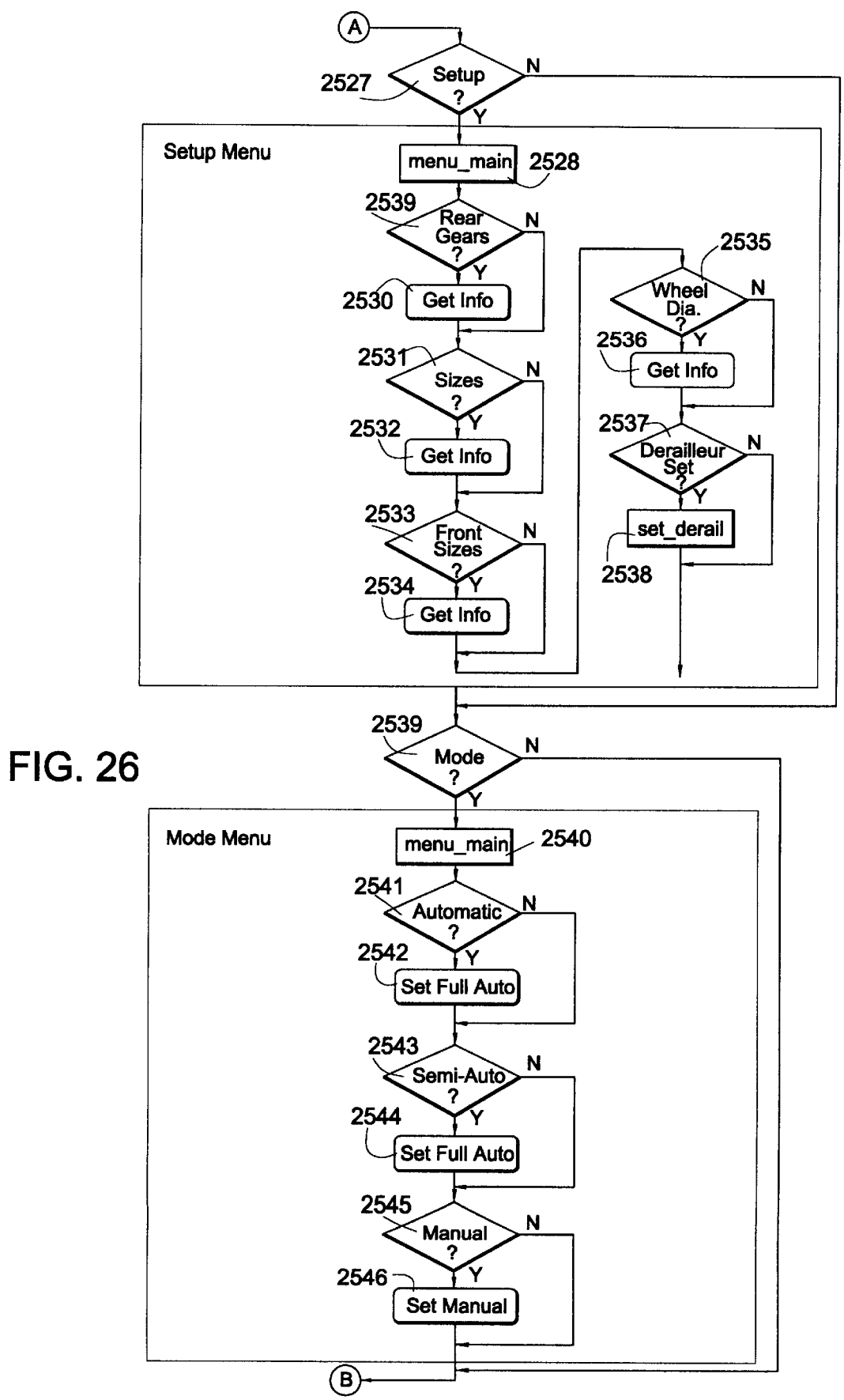
Figure 27:
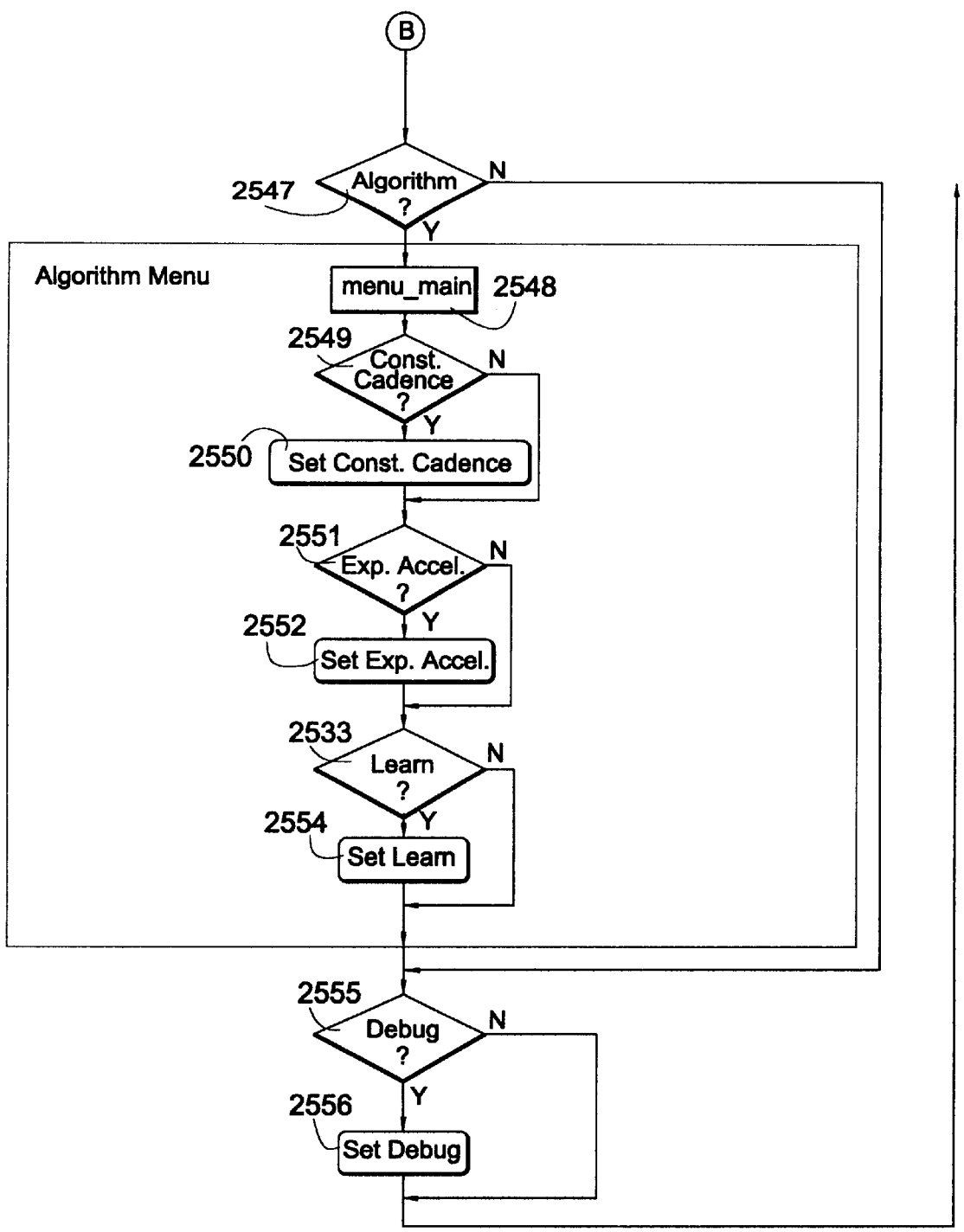

FIGS. 25, 26 and 27 show an exemplary flow diagram of the main user interface service loop 2500. Interface service loop 2500 is entered at 2501 at power on-initialization where display 31 is actuated to momentarily display a power on/reset message. At 2502, display 31 is cleared. At 2503, the set up variables are set to their default settings and displayed. Display 31 is cleared at 2504. Statistical values are calculated for bicycle characteristic inputs and user characteristic inputs that are stored in memory at 2505. At 2506, it is determined whether the bicycle is moving. If not, flow continues to 2507 where the system is shutdown for conserving the battery.

If the bicycle is moving, a key read module is entered by flow continuing to 2508 where it is determined whether the up key has been actuated. If yes, flow continues to 2509 where appropriate data is retrieved from memory for determining whether a shift should occur at 2510. If a shift should occur, the derailleur motor is actuated at 2511, display 31 is updated at 2512 and flow continues to 2508.

If the up key is not actuated at 2508, it is determined whether the down key has been actuated at 2513. If it has, flow continues to 2514 where appropriate data is retrieved from memory for determining whether a shift should occur. If a shift should occur, the derailleur motor is actuated at 2515, display 31 is updated at 2516 and flow continues to 2513.

If the down key has not been actuated 2513, flow continues to 2517 where the current gear ratio is returned. At 2518, it is determined whether the mode key has been actuated. If not, flow continues to 2504. If the mode key has been actuated, flow continues to 2519 where the up and down keys are read. At 2520, it is determined whether the up key has been actuated. If yes, then the next menu is displayed on display 31. Flow continues to 2519. If the up key has not been actuated, flow continues to 2522 where it is determined whether the down key has been actuated. If so, the previous menu is displayed on display 31 at 2423 and flow continues to 2519. If the down key has not been actuated, flow continues to 2514 where it is determined whether the enter key has been actuated. If not, flow continues to 2519. If the enter key has been actuated, an object item number is returned at 2525 and at 2526 it is determined whether the main menu loop should be exited. If yes, flow continues to 2504. If not, flow continues to 2527 (FIG. 26), where it is determined whether the system setup containing information for the bicycle is to be changed.

If the system setup for the bicycle is to be changed, flow continues to 2528 where display 31 displays a setup menu. If not, flow continues to 2539. From 2528, flow continues to 2529, where it is determined whether the rear gears are to be changed. If yes, flow continues to 2530 where the user is prompted for inputting information regarding the rear gears, and flow continues to 2531. If the rear gear information is not to be changed, flow continues to 2531, where it is determined whether gear size information is to be entered. At 2532, gear size information is entered and flow continues to 2533, otherwise flow continues from 2531 to 2533. At 2533, it is determined whether sizes of front gears is to be changed. If not, flow continues to 2535. If the front gear information is to be changed, the information is entered at 2534. Flow then continues to 2535, where it is determined whether the wheel diameter information is to be changed. If so, the wheel diameter information is entered at 2536, and flow continues to 2537. If not, flow continues to 2537, where it is determined whether the derailleur mechanism needs to be set. If so, flow continues to 2538 where the derailleur mechanism is set, and then to 2539. If not, flow continues to 2539.

At 2539, it is determined whether the operating mode of the system is to be changed. If the operating mode of the system is not to be changed, flow continues to 2547. Otherwise, flow continues to 2540, where the mode menu is displayed. Flow continues to 2541, where it is determined whether the automatic mode is to be set. If so, flow continues to 2542 where the automatic mode is set. Flow then continues to 2543. If the automatic mode is not to be set, flow continues to 2543, where it is determined whether the semi-automatic mode of operation is to be set. The semi-automatic mode of operation is a manual override of current automatically-determined parameters. The semi-automatic mode of operation is exited when sensors indicate that a higher or lower shiftpoint has been reached. If the semi-automatic mode of operation is to be set, flow continues to 2544 where the semi-automatic mode is set. Flow then continues to 2545. If the semi-automatic mode is not to be set, flow continues from 2543 to 2545. At 2545, it is determined whether the manual mode of operation is to be set. If so, flow continues to 2546 where the manual mode is set. Flow then continues to 2547. If not, flow continues around 2546 to 2547.

At 2547, it is determined whether the shifting algorithm is to be set. If not, flow continues to 2555. If the shifting algorithm is to be set, flow continues to 2548 where the algorithm menu is displayed by display 31. At 2549, it is determined whether the algorithm is to be based on providing a constant cadence. If not, flow continues to 2551. If the shifting algorithm is to be based on constant cadence, the constant cadence algorithm mode is set at 2550 and flow continues to 2551. At 2551, it is determined whether the shifting algorithm is to be based on an exponential acceleration. If so, flow continues to 2552 where the exponential acceleration mode is set, and flow continues to 2553. If not, flow continues around 2552 to 2553 where it is determined whether a learning mode should be invoked.

The learning mode manifests itself in two forms. First, there is a direct mode in which a rider places the present invention in a learning mode, and manually shifts for allowing controller 21 observe and record the rider's preferences. Controller 21 returns to an automatic setting from the learning mode. For the second manifestation of the learning mode, supplementary learning occurs invisibly to the rider when controller 21 is in the automatic mode. Whenever the rider manually overrides a gear selection in the automatic mode, controller 21 records the manual gear selection and makes adjustments to the riding profile for reflecting the change in preference.

If a learning mode is not to be invoked, flow continues to 2555. If the learning mode is to be invoked, flow continues to 2554 where the learning mode is invoked. Flow then continues to 2555.

For troubleshooting purposes, the present invention includes a debug mode. Of course, production units of the present invention would not include the debug mode. At 2555, it is determined whether the debug mode is to be entered. If not, flow continues to 2504. If the debug mode is to be entered, flow continues to 2556 where the debug mode is entered for troubleshooting operation of the present invention in a well-known manner. Flow continues to 2504 upon exiting the debug mode.

While the present invention has been described in connection with the illustrated embodiments, it will be appreciated and understood that modifications may be made without departing from the true spirit and scope of the invention.

What is claimed is:

1. A gear shifting system for a human-powered vehicle, comprising:
   a wheel speed sensor sensing a speed of a wheel of a human-powered vehicle;
   a cadence sensor sensing a drive rate of a torque drive member of the vehicle drives a torque-transmitting member of the vehicle;
   a gear changer position sensor sensing a position of a gear changer of the vehicle with respect to a plurality of gears of the vehicle;
   a tension sensor sensing a tension of a torque transmitting member transmitting a torque from the torque drive member to a gear of the plurality of gears;
   a clinometer sensing an inclination of the vehicle;
   a controller generating a control signal to change the position of the gear changer with respect to the plurality of gears based on the sensed wheel speed, the sensed drive rate, the sensed tension of the torque-transmitting member, the sensed vehicle inclination and the sensed gear changer position, the controller being inhibited from generating the control signal when the speed of the wheel is increasing; and
   a gear changer actuator coupled to the gear changer, the gear changer actuator positioning the gear changer with respect to the plurality of gears in response to the control signal.

2. The gear shifting system according to claim 1, wherein the human-powered vehicle is a bicycle.

3. The gear shifting system according to claim 2, wherein the
   torque drive member is a crank, and the cadence sensor senses a rate of rotation of the crank.

4. The gear shifting system according to claim 3, wherein the gear changer is a derailleur, and
   the gear changer sensor senses the position of the derailleur with respect to the plurality of gears.

5. The gear shifting system according to claim 4, wherein the torque-transmitting member is a chain, and
   the tension sensor senses a tension of the chain.

6. The gear shifting system according to claim 1, wherein the controller generates the control signal further based on an effort of a user of the vehicle, the effort being proportional to an average sensed tension of the torque-transmitting member during a predetermined period of time.

7. The gear shifting system according to claim 1, wherein the control signal comprises a shift-down signal and a shift-up signal, the gear changer actuator positioning the gear changer in response to the shift-down signal for decreasing a gear ratio of the vehicle, and positioning the gear changer in response to the shift-up signal for increasing the gear ratio of the vehicle.

8. The gear shifting system according to claim 7, wherein the sensed tension of the torque-transmitting member is based on a comparison of the sensed wheel speed and the sensed drive rate.

9. The gear shifting system according to claim 8, wherein the sensed tension of the torque-transmitting member is determined by comparing a product of a current gear ratio and the sensed wheel speed to the sensed drive rate.

10. The gear shifting system according to claim 7, wherein the tension sensor includes a displacement member that is displaced based on the tension of the torque-transmitting member.

11. The gear shifting system according to claim 7, where the tension sensor includes a strain gauge that measures the tension of the torque-transmitting member based on a strain of the torque-transmitting member.

12. The gear shifting system according to claim 7, wherein the controller is further inhibited from generating the control signal when the tension of the torque-transmitting member is greater than a predetermined tension.

13. The gear shifting system according to claim 12, further comprising a shift-down switch and a shift-up switch, and
   wherein the controller is responsive to actuation of the shift-down switch by generating the shift-down signal and is responsive to actuation of the shift-up switch by generating the shift-up signal.

14. The gear shifting system according to claim 12, further comprising a heart rate monitor sensing a heart rate of a user of the vehicle, and
   wherein the controller generates the control signal further based on the sensed heart rate of the user.

15. The gear shifting system according to claim 14, wherein when the sensed user heart rate is less than a first predetermined heart rate, the controller generates a shift-up signal, and when the sensed user heart rate is greater than a second predetermined heart rate, the controller generates a shift-down signal, the second predetermined heart rate being greater than the first predetermined heart rate.

16. The gear shifting system according to claim 15, further
   comprising a memory, and wherein a target heart rate is stored in the memory, the first predetermined heart rate being less than the target heart rate by a predetermined difference and the second predetermined heart rate being greater than the target heart rate by the predetermined difference.

17. The gear shifting system according to claim 16, further comprising a display device displaying at least one of a speed related to the sensed wheel speed, the sensed drive rate, an indication of a gear ratio, and the sensed user heart rate.

18. The gear shifting system according to claim 7, wherein when the sensed drive rate is less than a first predetermined value, the controller is enabled for generating a shift-down signal, and when the sensed drive rate is greater than a second predetermined value, the controller is enabled for generating a shift-up signal, the second predetermined value being greater than the first predetermined value.

19. The gear shifting system according to claim 18, wherein the
   controller includes a memory, and wherein a target cadence rate value is stored in the memory, the first predetermined value being less than the target cadence rate value by a predetermined difference and the second predetermined value being greater than the target cadence rate value by the predetermined difference.

20. The gear shifting system according to claim 1, wherein the controller generates the control signal using a fuzzy rule system that is based on the sensed wheel speed, the sensed drive rate, the sensed tension of the torque-transmitting member, the sensed vehicle inclination and a gear ratio as decision parameters.

21. The gear shifting system according to claim 20, further comprising a heart rate monitor monitoring a heart rate of a user of the vehicle, and wherein the decision parameters of the fuzzy rule system are further based on the sensed heart rate of the user.

22. The gear shifting system according to claim 21, wherein the decision parameters of the fuzzy rule system are further based on an effort of the user of the vehicle, the effort being proportional to an average sensed tension of the torque-transmitting member during a predetermined period of time.

23. The gear shifting system according to claim 1, wherein the controller includes a learning mode of operation, the controller generating the control signal based on the sensed wheel speed, the sensed drive rate, the sensed tension of the torque-transmitting member, the sensed vehicle inclination and the sensed gear changer position as decision parameters when in the learning mode of operation.

24. The gear shifting system according to claim 23, wherein the decision parameters of the controller further include an effort of a user of the vehicle, the effort being proportional to an average sensed tension of the torque-transmitting member during a predetermined period of time.

25. The gear shifting system according to claim 1, wherein the controller includes a memory, and wherein the controller includes a learning mode of operation and a normal mode of operation, the controller accepting and storing user preferences for wheel speed, drive rate, torque-transmitting member tension, vehicle inclination and the gear changer position in the learning mode of operation, and the controller generating the control signal based on the sensed wheel speed, the sensed drive rate, the sensed tension of the torque-transmitting member, the sensed vehicle inclination, the sensed gear changer position in the normal mode of operation.

26. A gear shifting system for a human-powered vehicle, comprising:

a wheel speed sensor sensing a speed of a wheel of a human-powered vehicle;

a tension sensor sensing a tension of a torque-transmitting member of the human-powered vehicle, the torque-transmitting member transmitting a torque applied to a torque drive member of the vehicle to a gear of a plurality of gears of the vehicle;

a controller generating a control signal based on the sensed wheel speed and the sensed tension of the torque-transmitting member, the controller being inhibited from generating the control signal when the speed of the wheel is increasing; and a gear changer actuator coupled to a gear changer of the vehicle, the gear changer positioning the torque-transmitting member with respect to the plurality of gears, the gear changer actuator moving the gear changer in response to the control signal and positioning the torque-transmitting member with respect to the plurality of gears.

27. The gear shifting system according to claim 26, wherein the human-powered vehicle is a bicycle.

* * * * *